(12) United States Patent
Indermaur

(10) Patent No.: US 11,574,365 B2
(45) Date of Patent: Feb. 7, 2023

(54) TOKEN-BASED PRE-APPROVAL SYSTEMS AND METHODS FOR PAYMENT REQUEST SUBMISSIONS

(71) Applicant: Optum, Inc., Minnetonka, MN (US)

(72) Inventor: Kurt Indermaur, Minnetonka, MN (US)

(73) Assignee: Optum, Inc., Minnetonka, MN (US)

( * ) Notice: Subject to any disclaimer, the term of this patent is extended or adjusted under 35 U.S.C. 154(b) by 657 days.

(21) Appl. No.: 16/442,698

(22) Filed: Jun. 17, 2019

(65) Prior Publication Data
US 2020/0394715 A1    Dec. 17, 2020

(51) Int. Cl.
G06Q 40/08 (2012.01)
G06Q 20/40 (2012.01)

(52) U.S. Cl.
CPC ......... G06Q 40/08 (2013.01); G06Q 20/4016 (2013.01)

(58) Field of Classification Search
CPC .......................... G06Q 40/08; G06Q 20/4016
See application file for complete search history.

(56) References Cited

U.S. PATENT DOCUMENTS

| | | | |
|---|---|---|---|
| 8,731,962 B2 | 5/2014 | Seib et al. | |
| 8,738,402 B2 | 5/2014 | Chapman et al. | |
| 2012/0029938 A1 | 2/2012 | Lauter et al. | |
| 2013/0006655 A1 | 1/2013 | Van Arkel et al. | |
| 2015/0032625 A1* | 1/2015 | Dill | G06Q 20/4016 705/44 |
| 2015/0332283 A1 | 11/2015 | Witchey | |
| 2016/0277380 A1* | 9/2016 | Wagner | H04L 63/0861 |
| 2017/0329910 A1 | 11/2017 | Selwanes | |
| 2018/0089379 A1 | 3/2018 | Collins et al. | |
| 2018/0374083 A1* | 12/2018 | Krishnaiah | G06Q 20/401 |
| 2021/0097546 A1* | 4/2021 | Adjaoute | G06Q 30/0201 |

* cited by examiner

*Primary Examiner* — Bennett M Sigmond
*Assistant Examiner* — Xavier M. Bennett
(74) *Attorney, Agent, or Firm* — Alston & Bird LLP

(57) ABSTRACT

Methods, apparatus, systems, computing devices, computing entities, and/or the like for generating a pre-approval token for a claim payment request based at least in part on draft claim data. The pre-approval token may be appended to a final, formalized claim relating to the draft claim during a formal claim submission process to retrieve and apply the results of the pre-approval review to facilitate formal claim resolution.

15 Claims, 14 Drawing Sheets

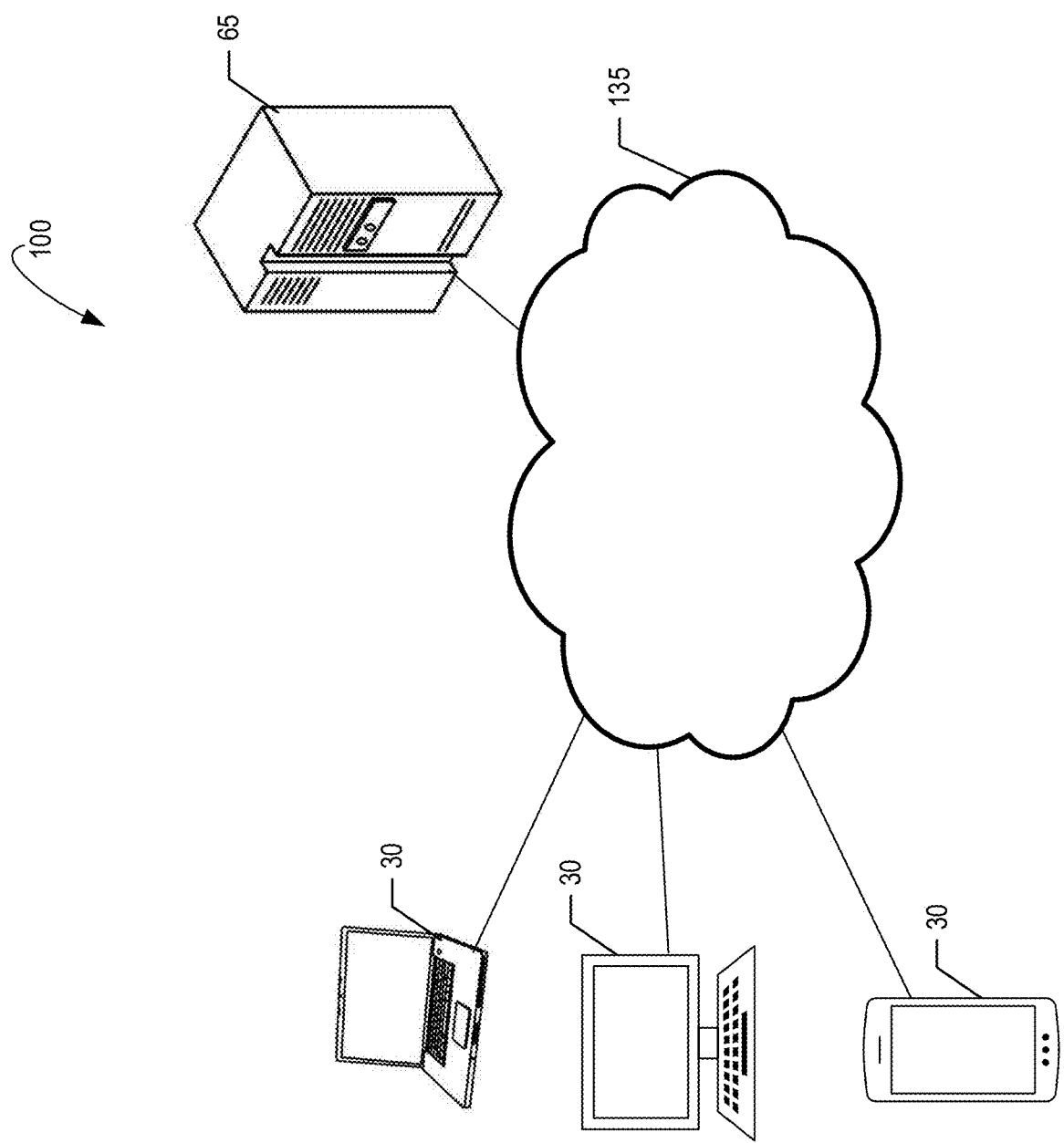

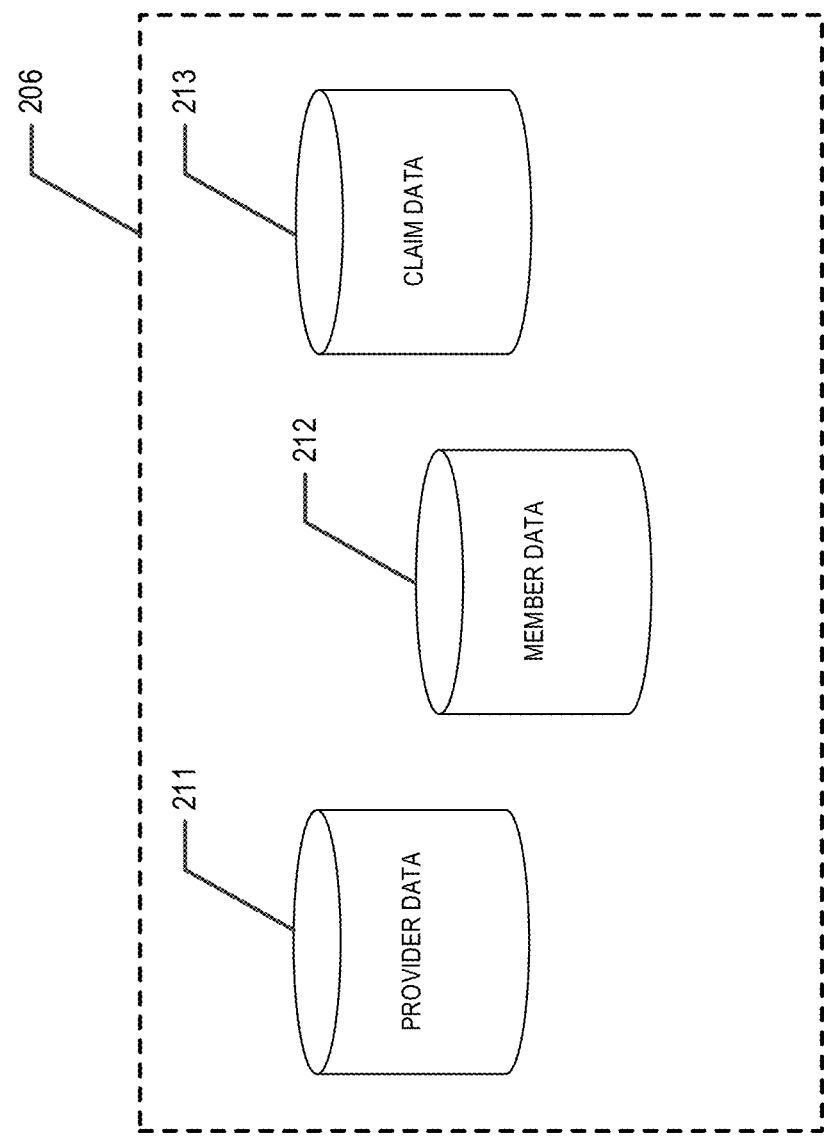

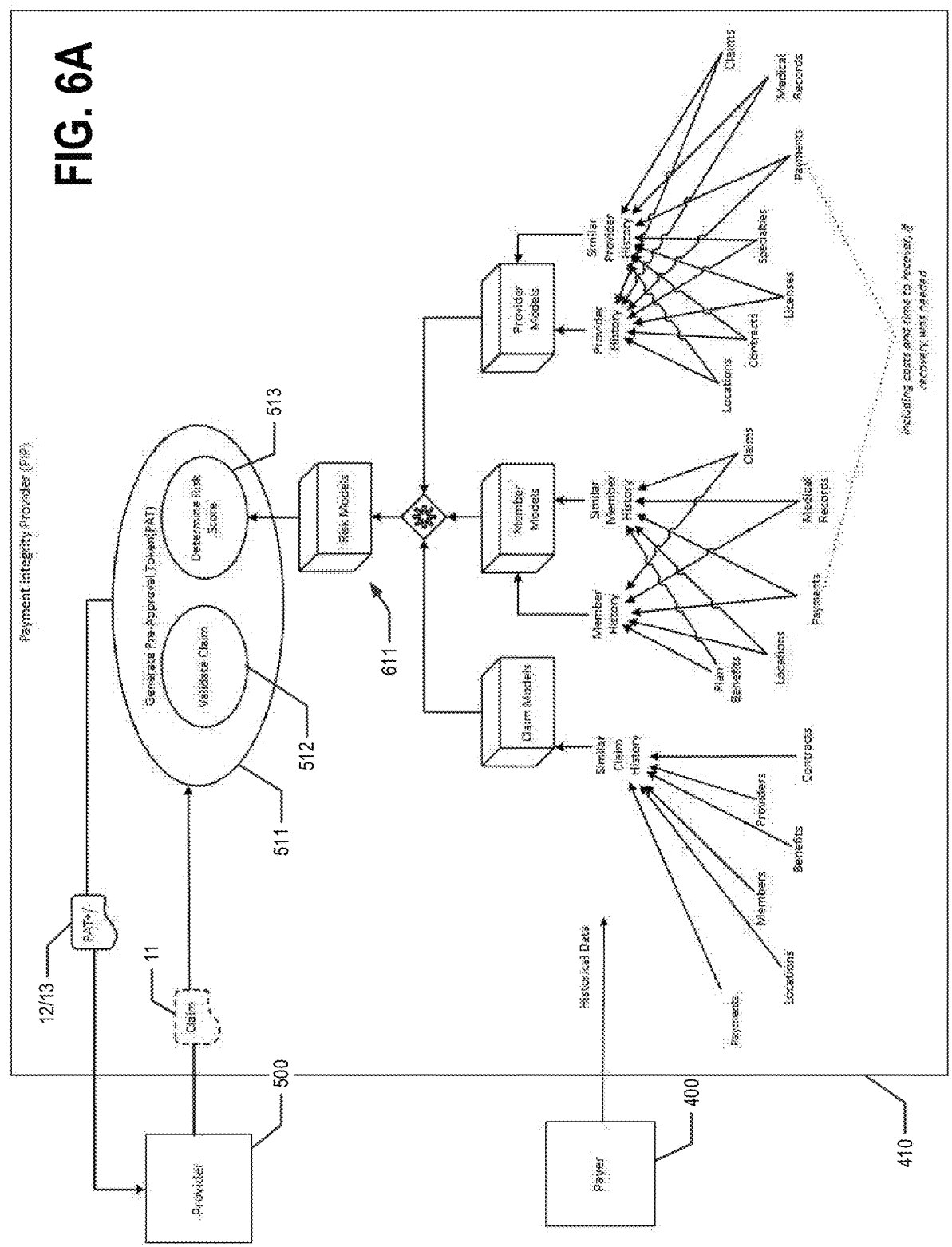

TOKEN-BASED PRE-APPROVAL SYSTEMS AND METHODS FOR PAYMENT REQUEST SUBMISSIONS

TECHNOLOGICAL FIELD

Embodiments of the present invention generally relate to token-based data submission systems and methods for matching data submissions to multiple entity computing systems, for example, for matching pre-submission approval packages for payment requests with post-submission payment requests.

BACKGROUND

As the medical industry strives to minimize the amount of wasteful, fraudulent, or abusive costs that are passed from medical service providers to medical payers, those medical payers have developed several systems and methods for scrutinizing each payment request received from a medical provider relating to services performed by the medical provider for particular patients. The processes involved in scrutinizing individual medical claims data has been known to slow the payment process for some claims—particularly those claims that are first submitted with one or more errors within the claims data. However, because the payment scrutiny processes often encompass multiple levels of review—potentially by different computing systems, departments within a large payer organization, and/or multiple entities, these errors may not be caught until well after the review process has begun. Those claims are then denied, and the provider must then resubmit those payment requests, thereby restarting the time-consuming payment approval process. In extreme cases, some providers may not receive payment (or a final denial of claim coverage for the patient) for several months after performing the medical services on the patient, leading to confusion and frustration for both the provider and patient in many cases.

Accordingly, a need exists for efficient systems and methods enabling providers to receive feedback on claims to be submitted for payment quickly, thereby enabling the provider to make necessary adjustments to the claim submission while relevant information remains easily accessible to the provider, so as to significantly decrease the latency associated with typical medical claim payment processes.

BRIEF SUMMARY

In general, embodiments of the present invention provide methods, apparatus, systems, computing devices, computing entities, and/or the like.

In accordance with one aspect, a computer-implemented method for resolving a claim is provided. In one embodiment, the method comprises receiving, by one or more processors, a draft claim comprising draft claim data transmitted from a first analytic computing entity of a plurality of analytic computing entities; determining, by the one or more processors, an approval status of the draft claim; generating, by the one or more processors and based at least in part on the draft claim, a pre-approval token (PAT) comprising an alphanumeric string indicative of the draft claim and the approval status of the draft claim; transmitting, by the one or more processors, the PAT to the first analytic computing entity; receiving, by the one or more processors, a formal claim paired with the PAT transmitted from a second analytic computing entity of the plurality of analytic computing entities; validating, by the one or more processors, the formal claim against the PAT at least in part by determining whether the formal claim matches the draft claim identified within the alphanumeric string of the PAT; and upon determining that the formal claim matches the PAT, resolving the formal claim based on the approval status identified by the PAT by transmitting a message to the second analytic computing entity, wherein the message comprises a payment recommendation for the formal claim.

In certain embodiments, determining an approval status of the draft claim comprises: executing one or more risk score models to identify one or more risk scores for the draft claim; generating an overall risk score based at least in part on the results of the one or more risk score models; and determining, based at least in part on the overall risk score, the approval status of the draft claim.

Moreover, generating a PAT may comprise combining at least a portion of the draft claim data and the approval status of the draft claim to create PAT data; and hashing the PAT data to generate the PAT. In certain embodiments, generating a PAT further comprises cryptographically signing the PAT. In various embodiments, validating the formal claim against the PAT comprises determining whether the formal claim is a modified version of the draft claim. In certain embodiments, resolving the formal claim comprises: upon determining that the approval status is a positive approval status, transmit a positive payment recommendation to the second analytic computing entity; and upon determining that the approval status is a negative approval status, transmit a negative payment commendation to the second analytic computing entity.

In accordance with yet another aspect, a computing system comprising at least one processor and at least one memory including computer program code is provided. In certain embodiments, the computing system is configured to: receive a draft claim comprising draft claim data transmitted from a first analytic computing entity of a plurality of analytic computing entities; determine an approval status of the draft claim; generate, based at least in part on the draft claim, a pre-approval token (PAT) comprising an alphanumeric string indicative of the draft claim and the approval status of the draft claim; transmit the PAT to the first analytic computing entity; receive a formal claim paired with the PAT transmitted from a second analytic computing entity of the plurality of analytic computing entities; validate the formal claim against the PAT at least in part by determining whether the formal claim matches the draft claim identified within the alphanumeric string of the PAT; and upon determining that the formal claim matches the PAT, resolve the formal claim based on the approval status identified by the PAT by transmitting a message to the second analytic computing entity, wherein the message comprises a payment recommendation for the formal claim.

In various embodiments, determining an approval status of the draft claim comprises: executing one or more risk score models to identify one or more risk scores for the draft claim; generating a combined risk score based at least in part on the results of the one or more risk score models; and determining, based at least in part on the combined risk score, the approval status of the draft claim.

In certain embodiments, generating a PAT comprises: combining at least a portion of the draft claim data and the approval status of the draft claim to create PAT data; and hashing the PAT data to generate the PAT. In various embodiments, generating a PAT further comprises cryptographically signing the PAT. Moreover, validating the formal claim against the PAT comprises determining whether the formal claim is a modified version of the draft claim. In certain embodiments, resolving the formal claim comprises: upon determining that the approval status is a positive approval status, transmit a positive payment recommendation to the second analytic computing entity; and upon determining that the approval status is a negative approval status, transmit a negative payment commendation to the second analytic computing entity.

In accordance with another aspect, a computer program product is provided. The computer program product may comprise a non-transitory computer readable medium having computer program instructions stored therein, the computer program instructions when executed by a processor, cause the processor to: receive a draft claim comprising draft claim data transmitted from a first analytic computing entity of a plurality of analytic computing entities; determine an approval status of the draft claim; generate, based at least in part on the draft claim, a pre-approval token (PAT) comprising an alphanumeric string indicative of the draft claim and the approval status of the draft claim; transmit the PAT to the first analytic computing entity; receive a formal claim paired with the PAT transmitted from a second analytic computing entity of the plurality of analytic computing entities; validate the formal claim against the PAT at least in part by determining whether the formal claim matches the draft claim identified within the alphanumeric string of the PAT; and upon determining that the formal claim matches the PAT, resolve the formal claim based on the approval status identified by the PAT by transmitting a message to the second analytic computing entity, wherein the message comprises a payment recommendation for the formal claim.

In certain embodiments, determining an approval status of the draft claim comprises: executing one or more risk score models to identify one or more risk scores for the draft claim; generating a combined risk score based at least in part on the results of the one or more risk score models; and determining, based at least in part on the combined risk score, the approval status of the draft claim. In various embodiments, generating a PAT comprises: combining at least a portion of the draft claim data and the approval status of the draft claim to create PAT data; and hashing the PAT data to generate the PAT. Moreover, generating a PAT may further comprise cryptographically signing the PAT. In certain embodiments, validating the formal claim against the PAT comprises determining whether the formal claim is a modified version of the draft claim. Moreover, resolving the formal claim may comprise: upon determining that the approval status is a positive approval status, transmit a positive payment recommendation to the second analytic computing entity; and upon determining that the approval status is a negative approval status, transmit a negative payment commendation to the second analytic computing entity.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIG. 1 is a diagram of a pre-approval system that can be used in conjunction with various embodiments of the present invention;

FIG. 2B is a schematic representation of a memory media storing a plurality of repositories, databases, data stores, and/or relational tables;

FIG. 6A illustrates a detailed flow diagram of a pre-approval and tokenization process in accordance with certain embodiments of the present invention;

DETAILED DESCRIPTION OF SOME EXAMPLE EMBODIMENTS

Figure 2A:
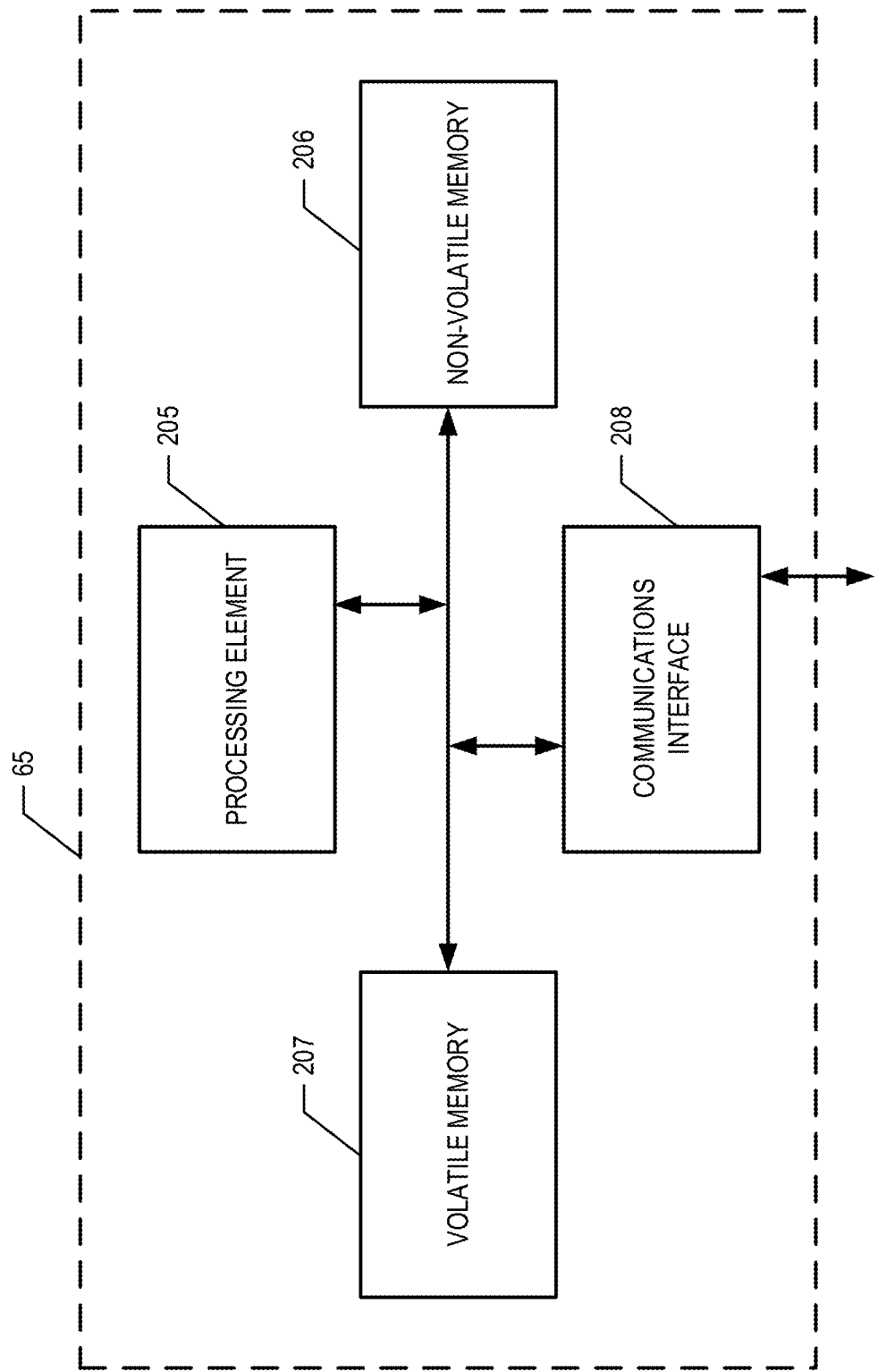
FIG. 2A is a schematic of an analytic computing entity in accordance with certain embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers refer to like elements throughout.

I. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. Exemplary System Architecture

FIG. 1 provides an illustration of a pre-approval system 100 that can be used in conjunction with various embodiments of the present invention. As shown in FIG. 1, the pre-approval system 100 may comprise one or more analytic computing entities 65 (e.g., an analytic computing entity 65 associated with a provider 500, an analytic computing entity 65 associated with a payer 400, an analytic computing entity 65 associated with a payment integrity provider 410, and/or the like), one or more user computing entities 30 (e.g., a user computing entity 30 associated with a provider usable to provide information/data to the provider's analytic computing entity 65; and/or the like), one or more networks 135, and/or the like. Each of the components of the system may be in electronic communication with, for example, one another over the same or different wireless or wired networks 135 including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

a. Exemplary Analytic Computing Entity

FIG. 2A provides a schematic of an analytic computing entity 65 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 65 may communicate with other analytic computing entities 65, one or more user computing entities 30, and/or the like.

As shown in FIG. 2A, in one embodiment, the analytic computing entity 65 may include or be in communication with one or more processing elements 205 (also referred to as processors, processing circuitry, and/or similar terms used herein interchangeably) that communicate with other elements within the analytic computing entity 65 via a bus, for example, or network connection. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the analytic computing entity 65 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably and in a general sense to refer to a structured or unstructured collection of information/data that is stored in a computer-readable storage medium.

Memory media 206 may also be embodied as a data storage device or devices, as a separate database server or servers, or as a combination of data storage devices and separate database servers. Further, in some embodiments, memory media 206 may be embodied as a distributed repository such that some of the stored information/data is stored centrally in a location within the system and other information/data is stored in one or more remote locations. Alternatively, in some embodiments, the distributed repository may be distributed over a plurality of remote storage locations only. An example of the embodiments contemplated herein would include a cloud data storage system maintained by a third party provider and where some or all of the information/data required for the operation of the pre-approval system may be stored. As a person of ordinary skill in the art would recognize, the information/data required for the operation of the pre-approval system may also be partially stored in the cloud data storage system and partially stored in a locally maintained data storage system.

Memory media 206 may include information/data accessed and stored by the pre-approval system to facilitate the operations of the system. More specifically, memory media 206 may encompass one or more data stores configured to store information/data usable in certain embodiments. For example, as shown in FIG. 2B, data stores encompassed within the memory media 206 may comprise provider information/data 211, member information/data 212, transaction information/data 213, and/or the like.

As illustrated in FIG. 2B, the memory media 206 may comprise provider information/data 211 having identifying information/data indicative of various providers. The term provider is used generally to refer to any person or entity that provides goods, services, and/or the like. For example, the provider information/data 211 may comprise provider identifiers, provider locations, provider relevancy scores, provider specialties, provider claim history, and/or the like. The provider information/data may further comprise provider flag information/data providing an indicator conveying that the provider is involved in an ongoing investigation or may need the provider's claims flagged for overpayment or fraud review.

Continuing with FIG. 2B, the memory media 206 may comprise member information/data 212. The member information/data 212 may comprise information/data for a member, such as age, gender, poverty rates, known health conditions, home location, profession, access to medical care, medical history, claim history, member identifier (ID), and/or the like. A relevancy score may identify the predicted level of interest or relevance to the member.

Continuing with FIG. 2B, the memory media 206 may comprise claim information/data 213 indicative of claims filed on behalf of a provider for services or products. Examples of providers include medical doctors, nurse practitioners, physician assistants, nurses, other medical professionals practicing in one or more of a plurality of medical specialties (e.g., psychiatry, pain management, anesthesiology, general surgery, emergency medicine, etc.), hospitals, urgent care centers, diagnostic laboratories, surgery centers, and/or the like. Moreover, the claim information/data 213 may further comprise prescription claim information/data. Prescription claim information/data may be used to extract information/data such as the identity of entities that prescribe certain drugs and the pharmacies who fulfill such prescriptions. The claim information/data 213 may also comprise communication flag information/data indicative of whether there are one or more communication logs associated with the claim.

In one embodiment, the analytic computing entity 65 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the analytic computing entity 65 with the assistance of the processing element 205 and operating system.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the analytic computing entity 65 may communicate with computing entities or communication interfaces of other analytic computing entities 65, user computing entities 30, and/or the like.

As indicated, in one embodiment, the analytic computing entity 65 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the analytic computing entity 65 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The analytic computing entity 65 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the analytic computing entity's components may be located remotely from other analytic computing entity 65 components, such as in a distributed system. Furthermore, one or more of the components may be aggregated and additional components performing functions described herein may be included in the analytic computing entity 65. Thus, the analytic computing entity 65 can be adapted to accommodate a variety of needs and circumstances.

b. Exemplary User Computing Entity

Figure 3:
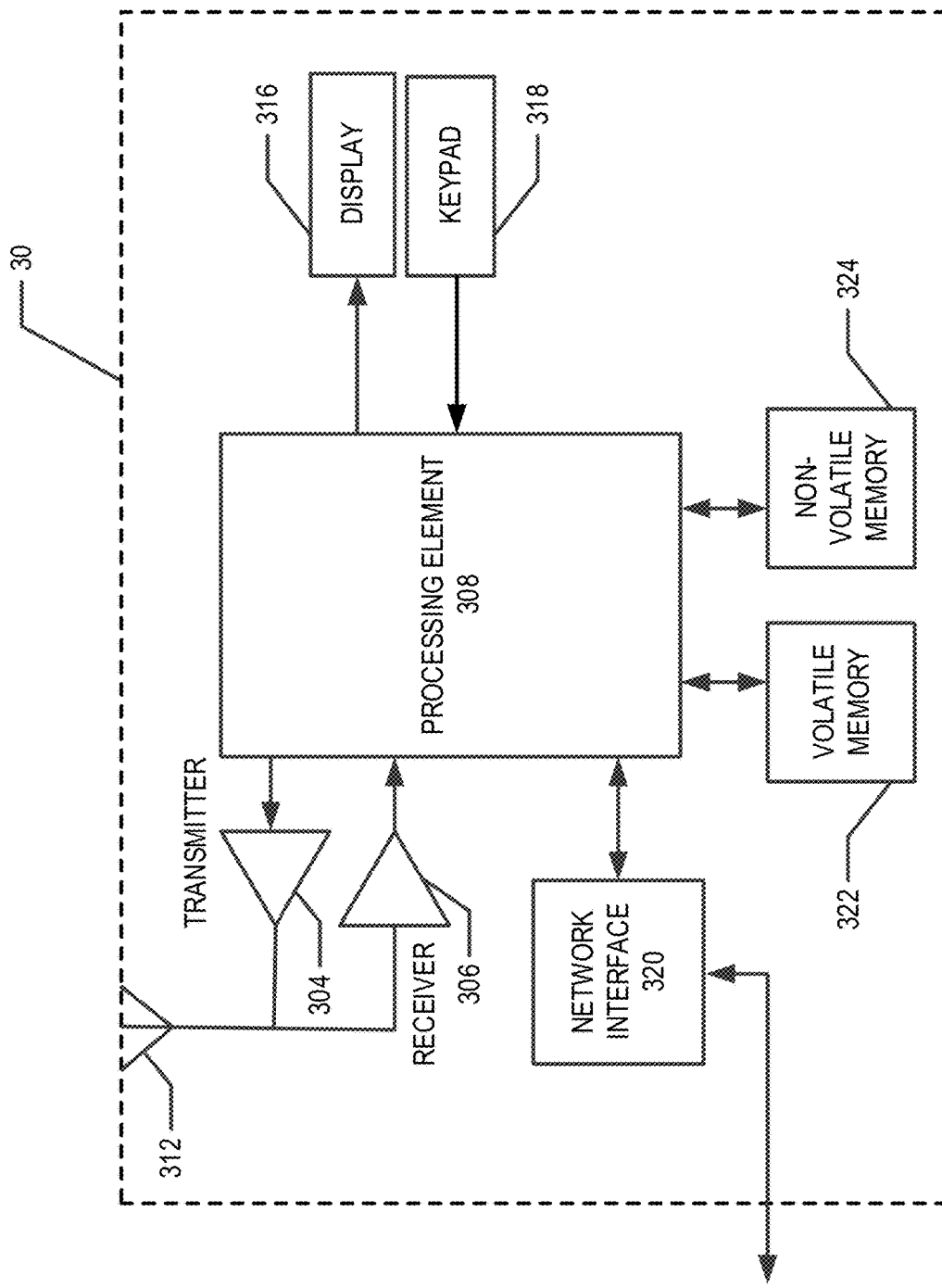
FIG. 3 is a schematic of a user computing entity in accordance with certain embodiments of the present invention.

FIG. 3 provides an illustrative schematic representative of user computing entity 30 that can be used in conjunction with embodiments of the present invention. As will be recognized, the user computing entity may be operated by an agent and include components and features similar to those described in conjunction with the analytic computing entity 65. Further, as shown in FIG. 3, the user computing entity may include additional components and features. For example, the user computing entity 30 can include an antenna 312, a transmitter 304 (e.g., radio), a receiver 306 (e.g., radio), a network interface 320, and a processing element 308 that provides signals to and receives signals from the transmitter 304 and receiver 306, respectively and/or the network interface 320. The signals provided to and received from the transmitter 304 and the receiver 306, respectively, may include signaling information/data in accordance with an air interface standard of applicable wireless systems to communicate with various entities, such as an analytic computing entity 65, another user computing entity 30, and/or the like. In this regard, the user computing entity 30 may be capable of operating with one or more air interface standards, communication protocols, modulation types, and access types. More particularly, the user computing entity 30 may operate in accordance with any of a number of wired or wireless communication standards and protocols. In a particular embodiment, the user computing entity 30 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the user computing entity 30 can communicate with various other entities using concepts such as Unstructured Supplementary Service data (USSD), Short Message Service (SMS), Multimedia Messaging Service (MIMS), Dual-Tone Multi-Frequency Signaling (DTMF), and/or Subscriber Identity Module Dialer (SIM dialer). The user computing entity 30 can also download changes, add-ons, and updates, for instance, to its firmware, software (e.g., including executable instructions, applications, program modules), and operating system.

According to one embodiment, the user computing entity 30 may include location determining aspects, devices, modules, functionalities, and/or similar words used herein interchangeably. For example, the user computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data/data may be determined by triangulating the position in connection with a variety of other systems, including cellular towers, Wi-Fi access points, and/or the like. Similarly, the user computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The user computing entity 30 may also comprise a user interface comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the user computing entity 30 to cause display or audible presentation of information/data and for user interaction therewith via one or more user input interfaces. The user output interface may be updated dynamically from communication with the analytic computing entity 65. The user input interface can comprise any of a number of devices allowing the user computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the user computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the user computing entity 30 can collect information/data, user interaction/input, and/or the like.

The user computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the user computing entity 30.

c. Exemplary Networks

In one embodiment, the networks 135 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 135 may have any suitable communication range associated therewith and may include, for example, global networks (e.g., the Internet), MANs, WANs, LANs, or PANs. In addition, the networks 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

III. Exemplary System Operation

Figure 4A:
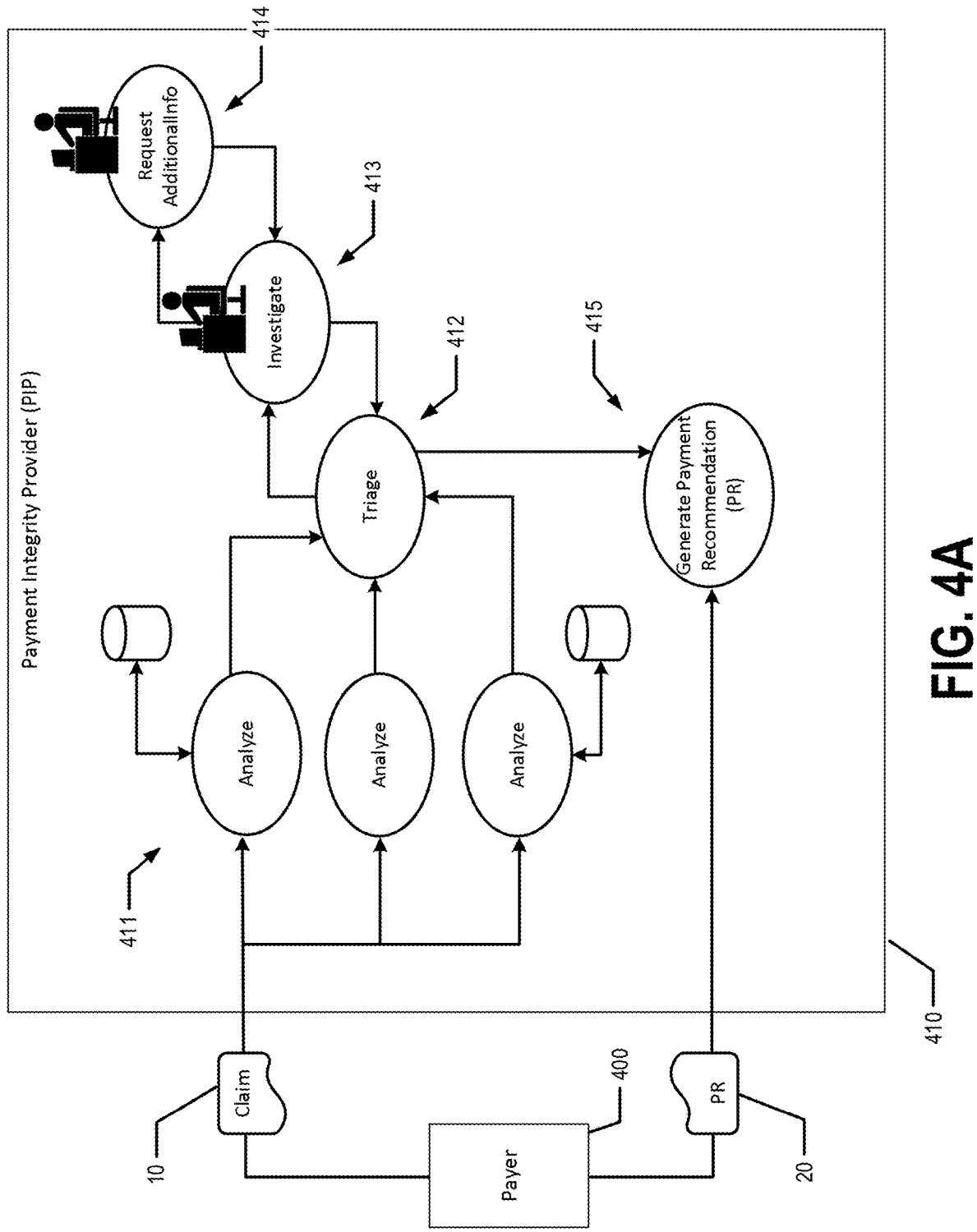
FIG. 4A illustrates a flow diagram of the scrutiny process for a typical claim.

Reference will now be made to FIGS. 4A-8B. FIG. 4A provides an exemplary data flow diagram of a traditional claim submission process. By contrast, FIG. 5A provides an exemplary data flow diagram of a claim submission process including a pre-approval and tokenization process. FIGS. 6A, 7A, and 8A provide additional detail regarding specific sub-processes of a pre-approval and tokenization process for claim submission in accordance with various embodiments. FIGS. 4B, 5B, 6B, 7B, and 8B are a flowchart for exemplary operations, steps, and processes.

a. Brief Overview

As indicated, there is a latent need for systems and methods to facilitate medical claim submissions to decrease the time and resources required to finally process medical claims generated by a provider for reimbursement by a payer for medical services provided to a member. In accordance with certain embodiments, computer systems and computer-implemented methods are provided for providing medical service providers with a real-time or near real-time pre-approval process through which the providers may electronically submit a draft/proposed medical claim from an analytic computing entity 65 associated with the provider (referred to herein as the provider 500) to an analytic computing entity 65 associated with a payment integrity provider (PIP) system (referred to herein as PIP 410), which is configured to review a draft claim (e.g., generated by a provider 500 before formal claim submission to a payer) and provide feedback in real-time or near real-time to the provider 500 in the event the draft claim is denied. The feedback is provided together with a pre-approval token indicative of the draft claim itself and indicating that the draft claim is denied. In the event the draft claim is approved, the PIP 410 provides the provider 500 with a pre-approval token indicative of the draft claim itself and the pre-approval status of the claim (e.g., a positive pre-approval or a negative pre-approval). In certain embodiments, the pre-approval token may comprise a hash of claim information/data and pre-approval information/data that may be transmitted to the provider 500 for storage in association with the draft claim 11, until submission of the formal claim 10 and pre-approval token to an analytic computing entity 65 associated with the payer (referred to herein as payer 400).

The provider 500 may then submit the claim with the pre-approval token to a payer 400. If the payer 400 (e.g., automatically and/or with manual intervention of payer employees) determines that the claim is identical to the claim information/data reflected within the pre-approval token, the payer 400 may significantly decrease the latency in providing approval for paying the provider 500 for the medical claim 10. Thus, in addition to providing the provider 500 with real-time or near real-time feedback as to whether a particular claim is likely to be approved upon submission to the payer 400, the pre-approval token additionally enables the payer 400 to capitalize on the pre-submission analysis performed by the PIP 410 in determining whether to generate a pre-approval token for the medical claim, thereby decreasing the amount of analysis required by the payer 400 (which may have historically been performed together with the PIP 410 after formal claim submission by the provider 500).

1. Technical Problem

A technical approach for enabling pre-submission review of payment requests in real-time or near real time will help medical care providers to ensure payment requests contain all necessary and relevant information to facilitate the payment approval submission process. In order to minimize the processing resources generally required for both a pre-submission review and a formal submission review, a technical solution is necessary to leverage the results of the pre-submission review during the later formal submission, thereby reducing the need for duplicative review procedures while providing users with the benefits of pre-submission review.

2. Technical Solution

To overcome at least the above-identified technical challenges, a pre-submission review process for payment requests enabling real-time or near real-time review of payment requests is provided, thereby providing medical care providers with feedback regarding proposed payment request submissions prior to formal submission. To minimize processing resources required for providing both pre-submission, draft claim review procedure and a formal claim submission review procedure, the pre-submission review process encompasses an associated tokenization process for generating a pre-approval token for those draft claims deemed approved during the pre-approval process. Thus, when a related formal claim submission is provided together with the pre-approval token, one or more approval processes need not be reinitiated for the claim submission if the submission is determined to match the pre-approval submission, as indicated within the pre-approval token.

b. Claim Submission without Pre-Approval

Figure 4B:
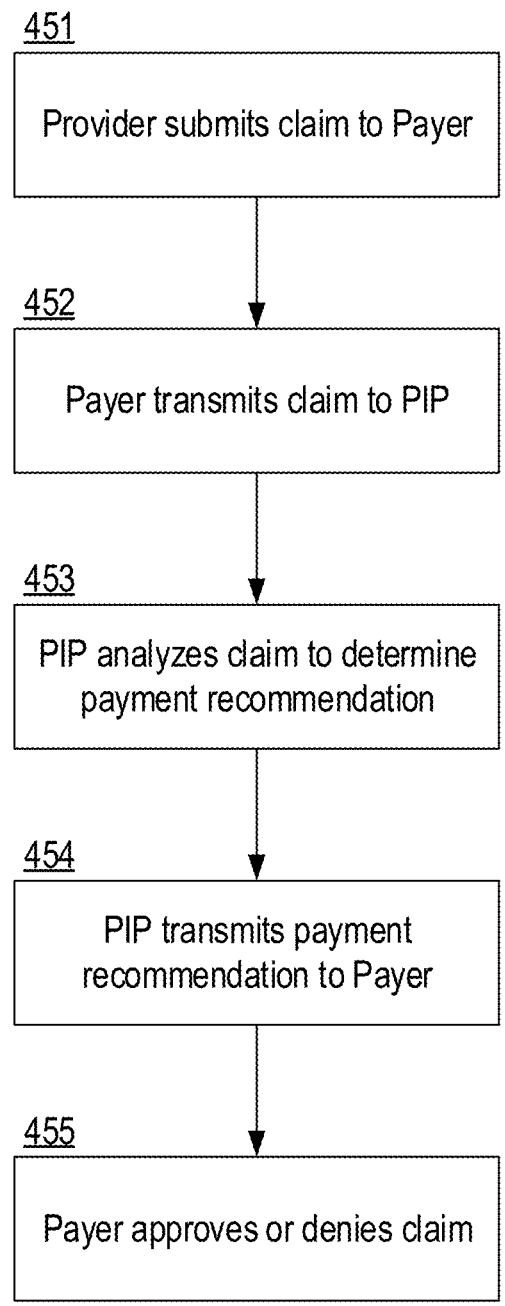
FIG. 4B is a flowchart for exemplary operations, steps, and processes in accordance with the embodiment of FIG. 4A.

FIG. 4A illustrates a process by which a claim is submitted for review without an associated pre-approval token, and FIG. 4B provides a flowchart illustrating the various steps associated therewith. Such a process may be utilized in association with certain existing systems and/or in association with claim submission processes wherein a pre-approval token is otherwise unavailable. As the payer 400 (an analytic computing entity 65 associated with a medical claim payer) is configured for determining whether or not a claim should be paid to a provider, interactions in accordance with embodiments represented by FIG. 4A are generally characterized by interactions between the payer 400 and a payment integrity provider (PIP) 410 (an analytic computing entity 65 associated with the payment integrity provider).

In accordance with various embodiments, a payer 400 may be associated with (e.g., operated by) an entity, such as a health insurance payer which provides financing to cover the costs of medical services provided for a member. As used herein, the term member may refer to a person who receives healthcare services or products rendered by a provider (e.g., a medical provider having an associated analytic computing entity 65 corresponding to the provider, referred to herein as a provider 500) and/or who relies on financing from a health insurance payer to cover the costs of the rendered health services or products. In that sense, a member is associated with the health insurance payer and is said to be a member of (a program associated with) the health insurance payer. In one embodiment, member features can include, but are not limited to, age, gender, poverty rates, known health conditions, home location, profession, access to medical care, medical history, claim history, member identifier, and/or the like. Those medical services are provided by a medical service provider 500, such a physician (or physician's office), hospital, nurse, urgent care center, and/or the like.

The payer 400 may rely on processing resources of a PIP 410 to process medical claims information/data for a claim 10 provided from a provider 500 and to provide a payment recommendation 20, which the payer 400 can utilize in association with the results of additional claim analysis performed independently by the payer 400 when determining whether to make a payment to the provider 500 for the submitted claim. In the healthcare context, a claim represents a request for payment/reimbursement for services rendered, materials used, equipment provided, and/or the like. For example, a claim may be a request for payment/reimbursement for a consultation with a primary care doctor, a medical procedure or an evaluation performed by an orthopedic surgeon, a laboratory test performed by a laboratory, a surgery, durable medical equipment provided to an injured patient, medications or other materials used in the treatment of a patient, and/or the like. As will be recognized, though, embodiments of the present invention are not limited to the medical context. Rather, they may be applied to a variety of other settings. For example, various embodiments may be provided for solution of mortgage pre-approval claims (e.g., using a pre-submission process to determine a likelihood of mortgage approval prior to formally submitting a request for mortgage approval), insurance claims (e.g., home insurance claims, vehicle insurance claims, and/or the like, medical prior authorizations (e.g., for specific medical services, prescriptions, and/or the like). Embodiments may be usable in other settings as well, for example, where a pre-approval indication may be usable to facilitate a formal request for approval of a claim of other types.

In one embodiment, each claim may be stored as a record that comprises a textual description of the type of claim to which the record corresponds and comprises member features, claim features, provider features, communication features, and/or the like. The various features and feature sets can be identified in a manual, semi-automatic, and/or automatic manner for identification and/or extraction for a given claim.

In practice, the process illustrated in FIG. 4A may begin after a provider 500 has submitted a claim 10 to the payer 400 for payment (as reflected at Block 451 of FIG. 4B). For example, the provider 500 may transmit (e.g., via an Application Program Interface (API) and/or other data exchange methodology) claim information/data corresponding to the claim 10 to the payer 400. In one embodiment, a user (e.g., provider, representative of the provider, and/or the like) may interact with and navigate a user interface of a medical claims software system executing on and/or accessible via a user computing entity 30 for providing access to the provider 500 (the analytic computing entity 65 associated with the provider). Through the user interface, the user may view, access, and/or edit claim information/data, such as to initiate a claim for submission for payment. In certain embodiments, the medical claims software system may be embodied as at least a portion of an electronic medical records (EMR) system accessible to the provider 500 and/or the payer 400. However, other software systems may be usable in certain embodiments. In certain embodiments, access to the medical claims software system may be limited to authorized users. To implement such limits, the analytic computing entity 65 may provide access to the system via a user profile that has been previously established and/or stored. In an example embodiment, a user profile comprises user profile information/data, such as a user identifier configured to uniquely identify the user (e.g., provider identifier, representative identifier, and/or the like), a username, user contact information/data (e.g., name, one or more electronic addresses such as emails, instant message usernames, social media user name, and/or the like), user preferences, user account information/data, user credentials, information/data identifying one or more user computing entities 30 corresponding to the user, and/or the like. Moreover, each user and/or user profile may correspond to a username, unique user identifier (e.g., 11111111), access credentials, and/or the like.

Upon gaining access to the medical claims software, the user may provide claim information/data, such as information/data indicative of a member associated with the claim, information/data indicative of the provider associated with the claim, one or more medical services (e.g., identified via procedure and/or diagnostic codes, such as ICD-10 codes) associated with the claim, one or more medications associated with the claim, a date associated with the claim, a time associated with the claim, and/or the like. Moreover, the claim information/data may identify other characteristics of the claim, the provider, and/or the member, such as a payer 400 to be associated with the claim 10, and/or the like.

Once the claim 10 is generated at the provider 500 and passed to the payer 400, the process illustrated in FIG. 4A may begin. The payer 400 and PIP 410 may pass information/data therebetween after a provider 500 has submitted a claim 10 to the payer 400 for payment. As reflected in FIG. 4A, the process begins when the payer 400 passes a claim 10 to the PIP 410 for processing (as also reflected at Block 452 of FIG. 4B). Because the process is performed without pre-approval, the claim 10 may be new to both the payer 400 and PIP 410 when initially received by the entities.

Once the PIP 410 receives the claim 10, the PIP 410 executes one or more analytics to determine attributes of the claim 10, as indicated at 411 of FIG. 4A. These analytics may identify similarities between the current claim 10 and previously submitted claims (as well as the payment recommendation ultimately generated for those previously submitted claims), characteristics of the claim 10, such as a provider 500 associated with the claim, a member associated with the claim, requested reimbursement amounts for the claim, medical services performed in association with the claim, and/or the like. The PIP 410 may thus identify potentially problematic characteristics of the claim (e.g., insufficient information, association with a historically problematic provider, and/or the like), and may compile the results of the various analytics and determine whether to generate a positive payment recommendation (thus recommending to the payer 400 to pay the submitted claim) or a negative payment recommendation (thus recommending to the payer 400 to deny the submitted claim) as reflected at 412 of FIG. 4A and Block 453 of FIG. 4B. Alternatively the PIP 410 may determine that additional investigation is required and may pass the claim information/data to one or more investigatory systems and/or personnel for further review, as indicated at 413 of FIG. 4A. The additional investigatory systems and/or personnel may thereafter request additional information about the claim, as indicated at 414 of FIG. 4A, and such requests for additional information may be passed to the payer 400, and ultimately to the provider 500, if deemed necessary. Based on the results of the analysis, the PIP transmits the generated payment recommendation to the payer 400, as indicated at Block 415 of FIG. 4A and Block 454 of FIG. 4B.

In many circumstances, even after the PIP 410 provides the payer with a payment recommendation 20 for a particular claim 10, the payer 400 may perform additional analysis on the claim 10 prior to making a final determination as to approve the claim 10 (and therefore make a payment to the provider) or to deny the claim 10. Accordingly, the entire process beginning when the provider 500 initially submits the claim 10 until the payer 400 makes a final determination about whether to approve or deny the claim is often a highly time-intensive process.

Ultimately, once the payer 400 makes a determination as to whether to approve or deny the claim 10, the payer 400 may pass information/data indicative of the claim status to the provider 500 (e.g., via an API to the medical claim software system utilized by the provider 500 to initiate the claim 10) as reflected at Block 455 of FIG. 4B. If the claim is denied, the provider 500 may then adjust and/or resubmit the claim 10 (e.g., via the medical claim software system) to the payer 400 for further consideration. After resubmission, the process discussed above including the payer 400 and PIP 410 performing respective analysis processes on the resubmitted claim 10 are performed, which may again constitute a highly time-intensive process for consideration of the resubmitted claim. If the claim is accepted, the provider 500 may receive (e.g., via the medical claim software system) an indication of payment from the payer 400.

c. Pre-Approval

Figure 5A:
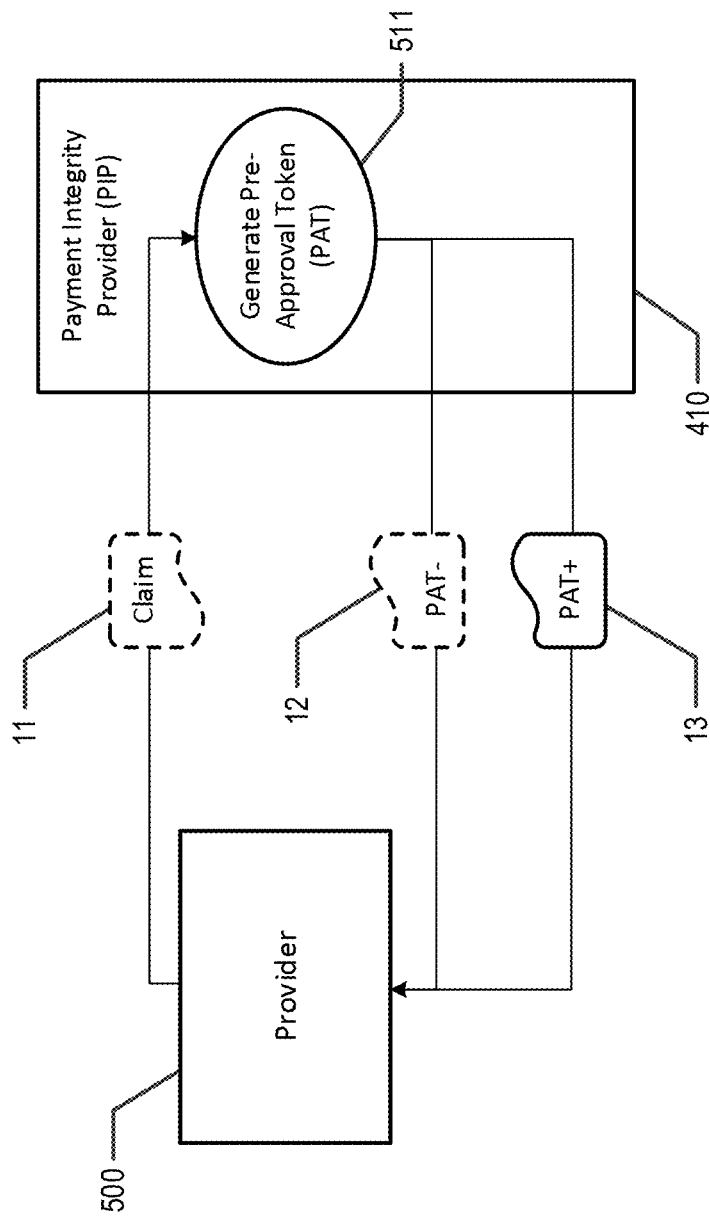
FIG. 5A illustrates a flow diagram of a pre-approval and tokenization process in accordance with certain embodiments of the present invention.
Figure 5B:
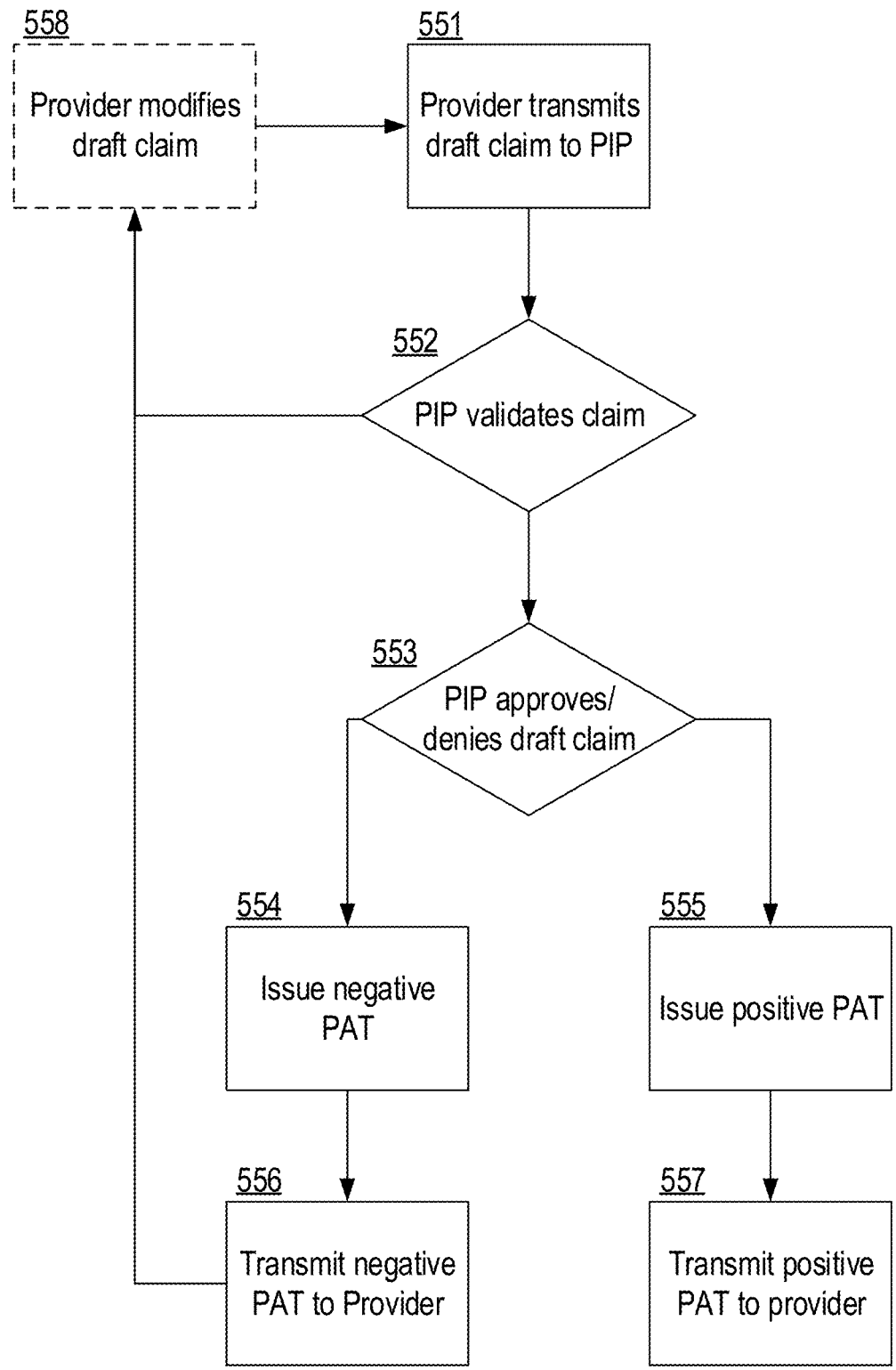
FIG. 5B is a flowchart for exemplary operations, steps, and processes in accordance with the embodiment of FIG. 5A.

To avoid certain delays associated with submitting a claim 10 through a formal submission process, various embodiments enable a provider 500 to request pre-approval for draft, or otherwise non-formalized claim submissions prior to beginning to formal claim submission process. The draft claims may comprise draft claim information/data matching information/data that would otherwise be included within a formal claim submission. FIG. 5A illustrates an example embodiment by which a provider 500 may request pre-approval for a draft claim 11, for example, directly from a PIP 410 (as indicated at Block 551 of FIG. 5A) and FIG. 5B is a flowchart illustrating example methodologies as illustrated in FIG. 5A. Although illustrated in FIG. 5A as embodied as a direct communication between the provider 500 and PIP 410, it should be understood that in certain embodiments, a provider 500 may submit requests for pre-approval for a draft claim 11 through a payer 400, which may pass the draft claim 11 along to the PIP 410 to initiate the pre-approval process.

In practice the provider 500 may utilize a medical claim software system executing on the provider analytic computing entity 65 to generate draft claims 11 (and formal claims 10) for submission in accordance with a pre-approval process. Draft claims 11 may comprise one or more pieces of claims information/data (referred to herein as draft claim information/data until finalized for formal submission as a claim 10) as discussed above, which may be generated based at least in part on user input (and/or other automatically generated input) by a user of the medical claim software system. In certain embodiments, the medical claim software system may be configured for direct communication between the provider 500 and the PIP 410 (e.g., via an API). However, as noted above, the medical claim software system may be configured for communication between the provider 500 and the payer 400, and the payer 400 may pass draft claims 11 to the PIP 410 for pre-submission consideration. Accordingly, the medical claim software system need not be configured for connection with multiple third party entities for execution of both the pre-approval submission process and the formal claim submission process.

Figure 6B:
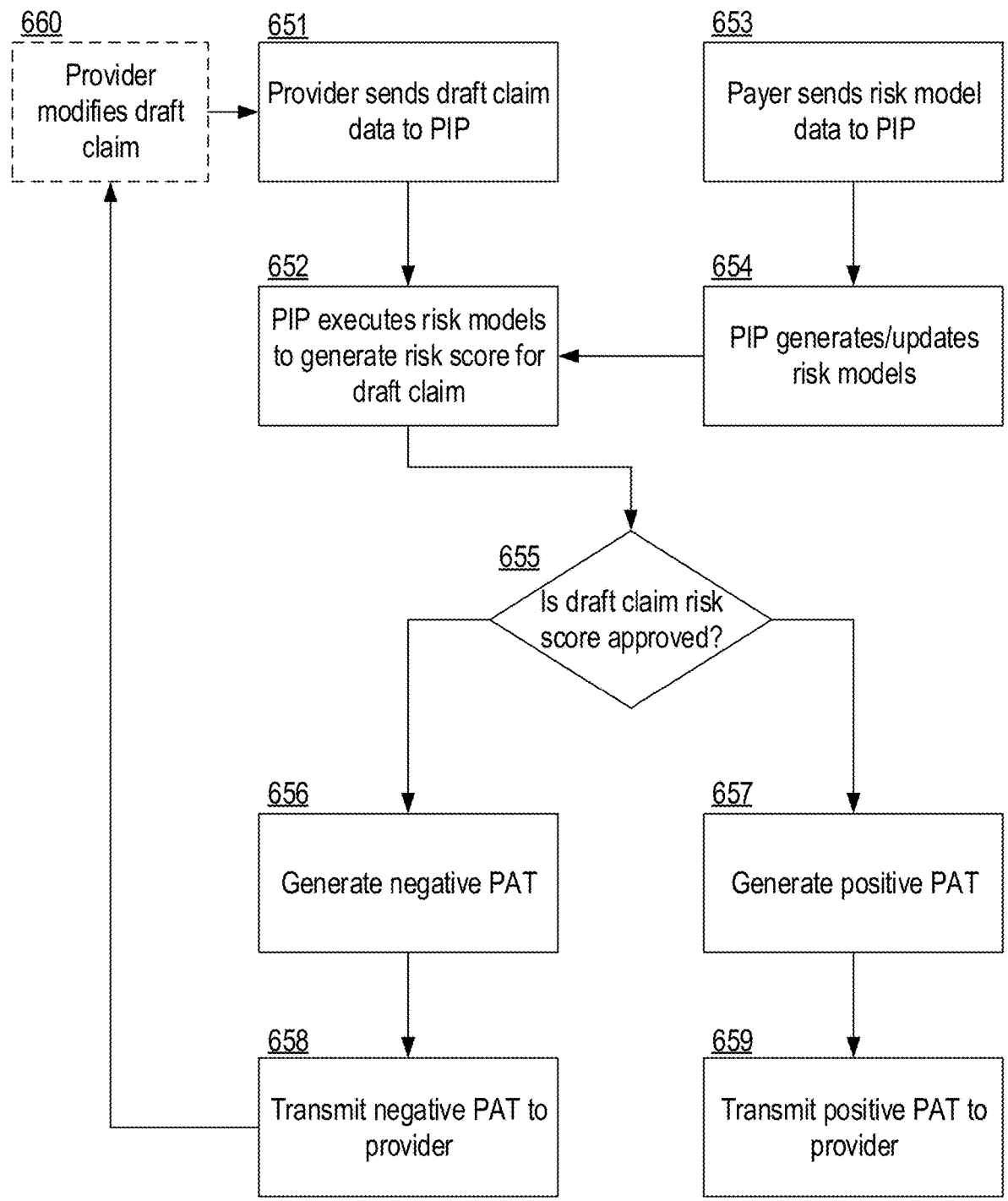
FIG. 6B is a flowchart for exemplary operations, steps, and processes in accordance with the embodiment of FIG. 6A.

As discussed in greater detail with respect to FIGS. 6A-6B, the PIP 410 may then utilize the draft claim information/data of the draft claim 11 and/or any other information/data accessible to the PIP 410 to determine whether any changes and/or updates are necessary before the PIP 410 may generate a pre-approval token (PAT). This pre-consideration validation of the draft claims 11, as reflected at Block 552 of FIG. 5B, ensures that processing resources are not unnecessarily utilized for incomplete claim submissions. For example, if the draft claim 11 does not include sufficient information/data to identify a member, a provider, or other basic information/data associated with the claim, the PIP 410 may determine that a PAT identifying the approval status of the draft claim cannot be issued, and the PIP 410 may provide an indication to the provider 500 indicating that the draft claim 11 is incomplete for generation of a PAT. Specifically, the PIP 410 may provide information/data to the medical claim software system of the provider 500 indicating that the draft claim 11 is incomplete. The provider 500 may modify the draft claim 11, as reflected at Block 558 of FIG. 5B, and may resubmit the draft claim 11 for review.

If the PIP 410 determines that the draft claim 11 is sufficiently complete to determine an approval status of the draft claim 11 and to generate a PAT, the PIP 410 determines whether the draft claim 11 is likely to be denied or approved (e.g., via one or more draft claim analytic processes, discussed in greater detail with respect to FIGS. 6A-6B, below) as reflected at Block 553 of FIG. 5B. As indicated at 511 of FIG. 5A, the PIP 410 generates a PAT to be provided to the provider 500 (e.g., to the provider's medical claim software system). If the PIP 410 makes a determination that a positive payment recommendation should be issued for the draft claim 11 (indicative of a positive approval status), the PIP 410 issues a positive PAT 13 to the provider 500 as indicated at Blocks 555 and 557 of FIG. 5B. Similarly, if the PIP 410 makes a determination that a negative payment recommendation (indicative of a negative approval status) should be issued for the draft claim 11 (e.g., the PIP 410 would recommend that payment should be denied for the draft claim 11), the PIP 410 issues a negative PAT 12 to the provider 500, as indicated at Blocks 554 and 556 of FIG. 5B. As noted above, if the PIP 410 determines that the draft claim should receive a negative payment recommendation, the provider 500 may adjust the draft claim 11 and resubmit the same until the provider 500 receives a positive approval status and corresponding positive PAT 13.

In certain embodiments, the PAT 12, 13 comprises at least a portion of the draft claim information/data indicative of the contents of the draft claim 11, as well as information/data indicative of whether the PAT is a negative PAT 12 or a positive PAT 13. In certain embodiments, the PAT 12, 13 may be a hash of the draft claim 11 and the indication of whether the PAT is a negative PAT 12 or a positive PAT 13. For verification, the PIP 410 may cryptographically sign the hash with an encryption key that may be utilized during later verification of the PAT 12, 13 to ensure the hash has not been tampered with.

In certain embodiments, the PAT 12, 13 may be associated with the draft claim 11 within the provider's medical claim software system, and the medical claim software system may be configured to generate a user output indicating whether the PAT is a negative PAT 12 or a positive PAT 13, thereby enabling the user to make a determination as to whether the draft claim 11 should be adjusted. In certain embodiments, the PIP 410 may provide additional, explanatory information/data along with the PAT. For negative PATs 12, the explanatory information/data may indicate why the draft claim 11 received a negative PAT 13, as well as what draft claim information/data within the draft claim 11 should be modified to receive a positive PAT 12 for the draft claim 11.

By associating the PAT 12, 13 with the draft claim 11 within the medical claim software system, the PAT 12, 13 may be automatically included with a claim 10 generated for the draft claim 11 for formal submission to the payer 400 (e.g., the draft claim 11 may be converted to a formal claim 10 for submission to a formal claim submission process based at least in part on user input received at the provider 500). As discussed in greater detail herein, the PAT 12, 13 may be provided with the claim 10 during the formal submission process, thereby enabling the payer 400 (and/or the PIP 410) to determine whether a corresponding draft claim 11 has been previously pre-approved for the submitted claim 10 and/or whether the submitted claim 10 at least substantially matches the previously submitted draft claim 11.

FIG. 6A provides additional detail of an example process associated with generating a PAT at a PIP 410 and FIG. 6B is a flowchart illustrating steps associated with the configuration of FIG. 6A. As discussed in reference to FIGS. 5A-5B, above, the process may begin upon a provider 500 sending a draft claim 11 to the PIP 410 for pre-approval review, as indicated at Block 651 of FIG. 6B. As a part of the process for generating a PAT (indicated at 511 of FIG. 5A), the PIP first determines whether to validate the draft claim 11, as indicated at 512 of FIG. 5A. In certain embodiments, determining whether to validate the draft claim 11 comprises steps for determining whether necessary information/data is included with the draft claim 11 that would enable the PIP 410 to make a determination as to whether a positive or negative payment recommendation would be generated for the draft claim (and to thereby generate a PAT). As discussed above, such a determination may comprise determining whether a member is identified as associated with the claim, whether a provider is identified as associated with the claim, whether appropriate procedure and/or diagnosis codes are associated with the claim, whether the claim has an associated requested reimbursement amount, and/or the like. If the PIP 410 is unable to validate the claim, the PIP 410 may provide a response to the provider 500 (e.g., to the provider's medical claim software system) indicating that further information/data is necessary before a PAT may be generated for the draft claim 11. However, if the PIP 410 is able to validate the draft claim 11, the PIP 410 may proceed to determine a risk score for the draft claim 11, as indicated at 513. The risk score may subsequently be utilized to determine whether a positive payment recommendation or a negative payment recommendation is likely to be generated for the draft claim 11, and therefore to determine whether a negative PAT 12 or a positive PAT 13 is to be generated and returned to the provider 500 for the draft claim 11.

The determination of an overall risk score for the draft claim 11 may be executed based at least in part on the results of one or more risk models, which are generated based at least in part on historical claim information/data, historical member information/data, historical provider information/data, member plan benefit information/data, provider contract information/data, and/or the like, which is provided to the PIP 410, for example, from the payer 400. Collectively, this risk model information/data may be provided from the payer 400 periodically (e.g., daily, weekly, monthly, hourly, and/or the like) as reflected at Block 653 of FIG. 6B, to ensure that the risk model information/data remains updated for determinations of risk scores for draft claims 11. The PIP 410 stores, transforms, and/or processes the risk model information/data into one or more risk models as reflected at Block 654 of FIG. 6B. These risk models may be updated periodically, for example, as new risk model information/data is received. The one or more risk models may be usable in real-time or near real-time to generate corresponding risk scores for draft claims 11 as they are received at the PIP 410.

With respect to the example embodiment of FIG. 6A, the risk models 611 may comprise one or more claim models, one or more member models, and/or one or more provider models. Each of these claim models may comprise a graph model, a hierarchical model, and/or the like. In certain embodiments, one or more of the models may comprise artificial intelligence models that utilize risk model information/data provided by the payer 400 as training information/data to generate appropriate models for each of the one or more claim models, member models, provider models, and/or the like.

As a specific example, a claim model may be generated based at least in part on historical claim information/data provided by the payer 400 as a part of the risk model information/data. A claim model may be generated based at least in part on attributes associated with historical claims, such as information/data indicative of payments received for historical claims, locations associated with historical claims, members associated with historical claims, benefits associated with historical claims, providers associated with historical claims, contracts associated with historical claims, and/or the like. Such information/data may be utilized to compare various attributes of those historical claims with a determination of whether the historical claim was ultimately paid by the payer. Accordingly, when implementing a claim model to make a payment recommendation for a draft claim 11, the claim models may make a determination of whether the draft claim 11 should receive a positive or negative payment recommendation based at least in part on the historical claim information/data. The resulting output of the claim model may be a claim risk score for the draft claim 11, wherein the claim risk score may be indicative of whether the claim model recommends payment for the draft claim 11.

As yet another specific example, a member model may be generated based at least in part on member information/data associated with the member identified within a draft claim 11 as well as similarly situated members to that member identified in the draft claim 11. Member models may be generated based at least in part on attributes associated with individual members, such as plan benefits applicable to individual members, locations associated with individual members, payments associated with individual members, medical records associated with individual members, claims associated with individual members, and/or the like. Such information/data may be utilized to compare various attributes associated with the individual members with a determination of whether one or more historical claims were ultimately paid for the individual member. Moreover, the attributes associated with the individual member may be indicative of whether the member has been previously flagged for further investigation (e.g., fraud investigations). Accordingly, when implementing a member model to make a payment recommendation for a draft claim 11, the member models may make a determination of whether the draft claim 11 should receive a positive or negative payment recommendation based at least in part on attributes of the member identified as associated with the draft claim 11, in light of attributes considered within the one or more member models. The resulting output of the member model may be a member risk score for the draft claim 11, wherein the member risk score may be indicative of whether the member model recommends payment for the draft claim 11.

As yet another example, a provider model may be generated based at least in part on provider information/data associated with the provider identified within a draft claim as well as similarly situated providers to that provider identified within the draft claim 11. Provider models may be generated based at least in part on attributes associated with individual providers, such as locations associated with the provider, contracts associated with the provider, licenses associated with the provider, specialties associated with the provider, payment history associated with the provider, medical records associated with the provider, claims associated with the provider, and/or the like. Moreover, the attributes associated with the individual provider may be indicative of whether the provider has been previously flagged for further investigation (e.g., fraud investigations). Accordingly, when implementing a provider model to make a payment recommendation for a draft claim 11, the provider models may make a determination of whether the draft claim 11 should receive a positive or negative payment recommendation based at least in part on attributes of the provider identified as associated with the draft claim 11, in light of attributes considered within the one or more provider models. The resulting output of the provider model may be a provider risk score for the draft claim 11, wherein the provider risk score may be indicative of whether the provider model recommends payment for the draft claim 11.

As indicated at 611 of FIG. 6A, risk scores generated by each of the one or more risk models executed for a particular draft claim 11 may be combined (e.g., averaged, weighted averaged, and/or the like) to generate an overall risk score for the draft claim 11 as also reflected at Block 652 of FIG. 6B. The overall risk score may then be compared against one or more criteria for determining whether a positive PAT 13 or a negative PAT 12 should be generated for the draft claim 11, as indicated at Block 653.

In certain embodiments, the analysis of a draft claim 11, including the execution of the one or more risk models may be executed in real-time or near real-time for a draft claim 11. Accordingly, a provider 500 may utilize the pre-approval process to quickly determine whether a draft claim 11 is likely to be accepted if/when submitted through the formal claim submission process, and to make recommended adjustments to the content of the draft claim 11 based at least in part on feedback received from the PIP 410 during the pre-approval process.

With reference again to FIG. 6A, upon determining whether the risk score for a particular draft claim 11 satisfies requirements for a negative PAT 12 or a positive PAT 13 (as reflected at Block 655 of FIG. 6B), the PIP 410 thereafter generates and transmits the PAT 12, 13 to the provider 500 (e.g., via an API), as reflected at Blocks 656-659, respectively.

As discussed above, the process for generating the PAT 12, 13 may comprise processes for combining claim information/data from the draft claim 11 with information/data indicative of whether the PAT is a positive PAT 13 or a negative PAT 12, and cryptographically generating the PAT including the combined information/data. As just one example, the PIP 410 may generate the PAT by hashing the combined information/data and cryptographically signing the hash, thereby ensuring information/data reflected by the hash has not been tampered with when utilizing the PAT during a later formal claim submission process.

d. Claim Submission with PAT

As discussed herein, submitting a claim 10 together with a PAT 12, 13 may enable a payer 400 and/or PIP 410 to leverage previous payment recommendation determinations provided for a claim 10 during a draft claim 11 (pre-approval request) stage of review to thereby facilitate processes for resolving the formal claim 10. Thus, the overall process for resolving a claim 10, including determining whether the claim 10 should be approved for payment or denied may be significantly faster than prior claim review processes, leading to greater provider and member satisfaction with the overall medical claim review procedure.

Figure 7A:
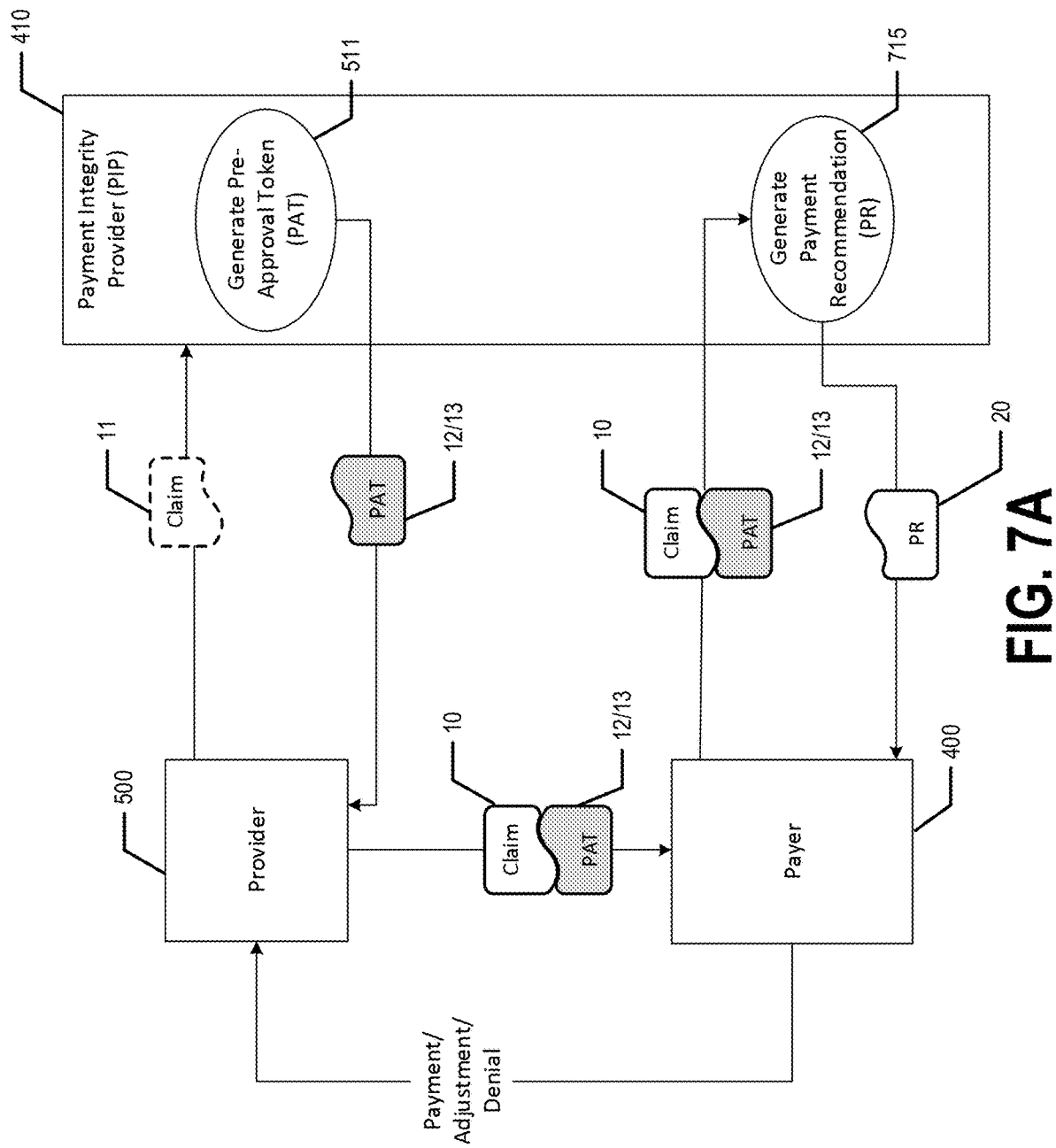
FIG. 7A illustrates a flow diagram of a scrutiny process including a pre-approval and tokenization process in accordance with certain embodiments of the present invention.
Figure 7B:
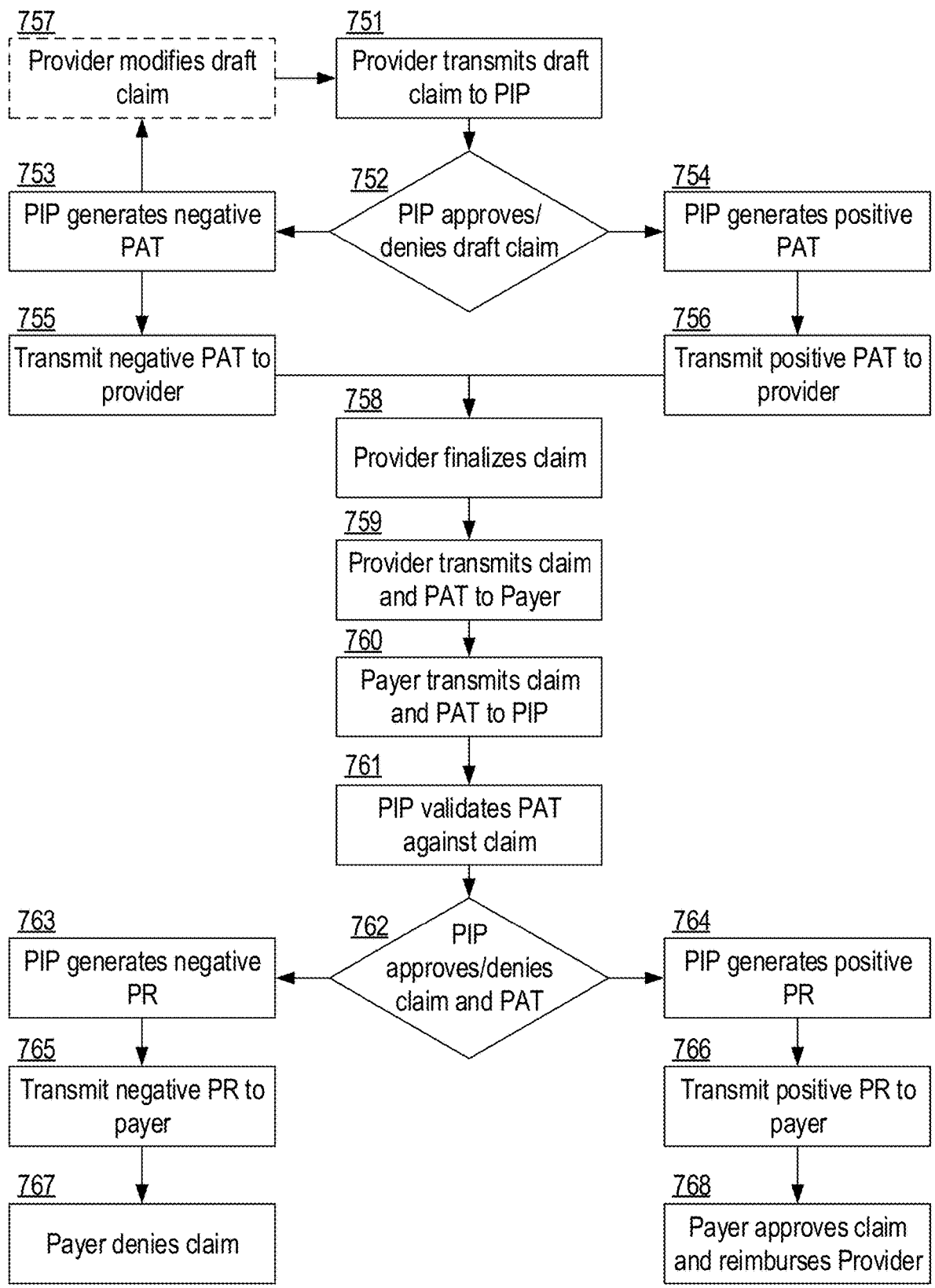
FIG. 7B is a flowchart for exemplary operations, steps, and processes in accordance with the embodiment of FIG. 7A.

FIG. 7A provides a high level overview of the process for moving from a draft claim 11 generated by a provider 500, to a formal claim 10 submitted together with an associated PAT 12, 13, which may be utilized to finally resolve the claim, by, in part, making a final determination as to whether the claim 10 should be approved or denied, and FIG. 7B is a high level flowchart of example processes in accordance with various embodiments.

As illustrated in FIG. 7A (and at Block 751 of FIG. 7B), a provider 500 transmits a draft claim 11 to the PIP 410 (e.g., via an API) for pre-approval before finalizing a related claim 10 for transmission via a formal submission process. As indicated at 511, the PIP 410 validates the draft claim 11, and generates a PAT 12, 13 for the draft claim 11 (as reflected at Blocks 752-754) as discussed in reference to FIGS. 5A-6B, above. As discussed above, the PAT may be a positive PAT 13 (indicating the PIP 410 has recommended payment for a claim 10 matching the submitted draft claim 11) or a negative PAT 12 (indicating the PIP 410 has recommended denying payment for a claim 10 matching the submitted draft claim 11).

The PAT 12, 13 is transmitted to the provider 500 (e.g., the medical claim software system associated with the provider 500) as indicated at Blocks 755-756 of FIG. 7B, for association with the draft claim 11 within the provider's system. The provider 500 may, in certain circumstances, modify the draft claim 11 after receipt of the PAT 12, 13 (e.g., for resubmission to the pre-approval process) as reflected at Block 757. However, as discussed herein, if the draft claim 11 is modified and formally submitted for approval, without first receiving an updated PAT 12, 13 reflecting the modifications (as reflected at Block 660 of FIG. 6B), the PAT 12, 13 may be disregarded during the formal claim submission process and/or the claim 10 may be rejected upon determining that the claim 10 does not match its corresponding PAT 12, 13.

The provider 500 finalizes the claim, as indicated at Block 758 of FIG. 7B, and the provider's medical claim software system may be configured to automatically append a related PAT 12, 13 with a claim 10 submitted for formal resolution and payment consideration. Based at least in part on associations between the PAT 12, 13 and the draft claim 11 for which the PAT was generated, and associations between the draft claim 11 and the final claim 10 (e.g., arising from a single claim file, submission, unique claim identifier, and/or the like), the medical claim software may be configured to automatically finalize the claim 10 by generating a submission packet including the claim 10 and the related PAT 12, 13. Accordingly, the medical claim software system may be configured such that users cannot selectively (or forgetfully) refrain from including the generated PAT 12, 13 for a claim 10, even if the PAT is embodied as a negative PAT 12 for the claim 10. As reflected at Block 759, the provider 500 thereafter transmits the claim 10 and the PAT 12, 13 to the payer 400 for formal submission.

With reference again to FIG. 7A, after receipt of the PAT 12, 13 from the PIP 410, the provider 500 (via the medical claim software system) may finalize a claim 10 corresponding to the draft claim 11 and PAT 12, 13, and may submit the claim 10 and corresponding PAT 12, 13 to the payer 400 to begin the formal claim submission process. As noted above, the payer 400 may perform an initial validation check of the claim 10 and associated PAT 12, 13 to determine whether the claim 10 matches the PAT 12, 13. As a specific example, the payer 400 may hash at least a portion of the claim 10 and may compare the resulting claim hash with the hash of the PAT 12, 13 to determine whether there is a match. Alternatively, the payer 400 may utilize a lookup based on a unique claim identifier and a unique PAT identifier to determine whether the claim matches attributes of the PAT. If the claim 10 has been modified, and therefore the claim 10 does not match the PAT 12, 13, the payer 400 may proceed to initiate the claim review procedure without consideration of the PAT 12, 13; thereby proceeding in accordance with the configuration discussed in reference to FIG. 4, above. Alternatively, the claim 10 may be rejected and returned to the provider 500, which may then begin the process by resubmitting a corresponding draft claim 11, reflective of the modifications, for pre-approval and generation of a corresponding PAT 12, 13.

Upon validating the claim 10 and PAT 12, 13 by determining that the claim 10 matches the submitted PAT 12, 13, the payer 400 submits the claim 10 and PAT 12, 13 to the PIP 410 as reflected at Block 760 for generation of a payment recommendation for the claim, as indicated at 715. Alternatively, as reflected in FIG. 7B, the PIP 410 may validate the claim 10 against the PAT 12, 13 (as shown at Block 761), for example, by ensuring the claim 10 matches claim information/data within the PAT 12, 13. The PIP 410 may leverage prior determinations of payment recommendations for the claim 10 as reflected within the PAT 12, 13. In certain embodiments, the PIP 410 may resolve the claim by generating a payment recommendation 20 based at least in part on a determination of whether the PAT 12, 13 is a positive PAT 13 or a negative PAT 12, as reflected at Block 762 of FIG. 7B. In certain embodiments, the PIP 410 may initiate a truncated claim analysis procedure based at least in part on the claim 10 and associated PAT 12, 13 to determine whether any updated risk model information/data would change the PIP 410 payment recommendation as compared with the PAT 12, 13.

The PIP 410 resolves the formal claim 10 by issuing the payment recommendation 20 to the payer 400 based at least in part on the results of the analysis performed for the claim 10 and PAT 12, 13 and as reflected at Blocks 763 and 765 (generating and issuing a negative payment recommendation) or Blocks 764 and 766 (generating and issuing a positive payment recommendation). In certain embodiments, the payer 400 may perform additional analysis and/or checks for the claim 10 prior to finalizing the claim submission process. For example, the payer 400 may determine whether there are any attributes of the claim, provider, and/or member that would justify a deviation relative to the payment recommendation 20 received from the PIP 410.

Upon finalizing the claim submission process, the payer 400 may initiate a payment to the provider 500 for compensation for the claim 10 (as reflected at Block 768 of FIG. 7B), and/or the payer 400 may provide information/data to the provider 500 indicating whether the claim 10 was accepted for payment or denied (as reflected at Block 767 of FIG. 7B). In the event the payment was denied, the provider 500 may reinitiate the claim submission process after adjusting the claim 10 (e.g., the provider 500 may restart with the pre-approval process, or the provider 500 may proceed to resubmit the claim 10 for formal consideration, for example, without a PAT 12, 13).

Although the foregoing discussion suggests that the payer 400 first determines whether a particular claim 10 matches a corresponding PAT 12, 13 before providing the same to the PIP 410 to generate a payment recommendation, it should be understood that such functionality may be performed by other computing entities in accordance with various embodiments. For example and with reference to FIGS. 8A-8B, once the payer 400 receives the claim 10 and PAT 12, 13, the payer 400 may transmit the same to the PIP 410 for validation and generation of a payment recommendation, as shown at 715 of FIG. 8A and Block 851 of FIG. 8B. As reflected at 815 of FIG. 8A, the PIP 410 may further confirm the PAT 12, 13 prior to utilizing the PAT 12, 13 to generate a payment recommendation 20 (based at least in part on a PAT result—indicating whether the PAT is a positive PAT 13 or a negative PAT 12, as indicated at Block 819 of FIG. 8A). For example, as shown at 817 of FIG. 8A, the PIP may first determine whether the PAT 12, 13 is valid and whether the PAT 12, 13 corresponds to the submitted claim 10 as reflected at Block 852 of FIG. 8B. The PIP 410 ensures the PAT 12, 13 has remained cryptographically secure since it was initially generated for the draft claim 11 during the pre-approval process discussed above. The PIP 410 may verify that the PAT 12, 13 was received from a trusted source (e.g., by determining whether metadata associated with the claim 10 and PAT 12, 13 transmission indicates that the information/data was transmitted by a trusted source (e.g., by comparing an IP address or other unique identifier associated with the transmitting source with a listing of known trusted sources). The PIP may further validate the encryption signature of the PAT 12, 13 to ensure the PAT 12, 13 was not tampered with since it was initially generated by the PIP 410 during the pre-approval process (e.g., by ensuring the encryption signature matches of the received PAT 12, 13 matches the encryption signature used to cryptographically seal the PAT 12, 13 when generated during the pre-approval process. Moreover, the PIP 410 may compare the contents of the PAT 12, 13 with contents of the claim 10 determine whether the PAT 12, 13 and claim 10 match at all. For example, such a comparison may comprise hashing at least a portion of the claim information/data to determine whether the resulting claim hash matches at least a portion of a hash embodying the PAT 12, 13. If the PIP 410 cannot validate the claim, for example, the encryption signature is invalid and/or the claim 10 does not match the PAT 12, 13, the PIP 410 may generate a negative payment recommendation to be provided to the payer 400, as indicated at Block 857 of FIG. 8B In certain embodiments, the PIP 410 may provide additional explanatory information/data indicating that the PAT 12, 13 could not be validated to explain the negative payment recommendation 20. In other embodiments, the PIP 410 may proceed to analyze the claim 10 under a traditional claim submission approach if the PAT 12, 13 cannot be validated, as reflected in the discussion above associated with FIGS. 4A-4B.

Figure 8A:
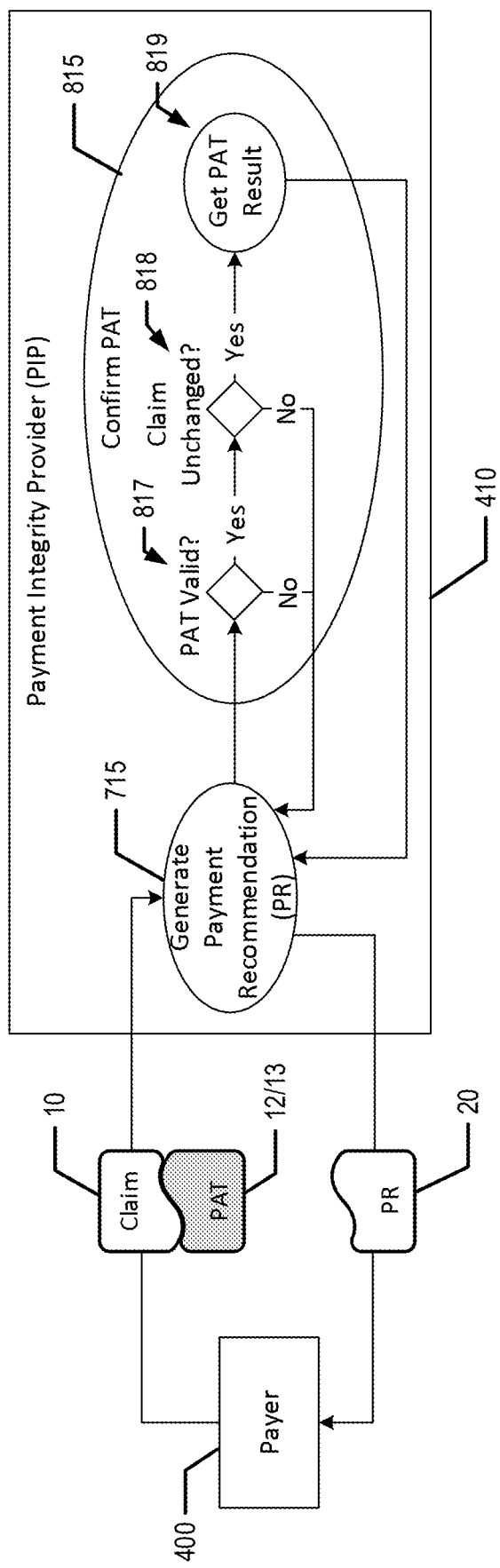
FIG. 8A illustrates a claim submission process utilizing a pre-approval token in accordance with certain embodiments of the present invention.
Figure 8B:
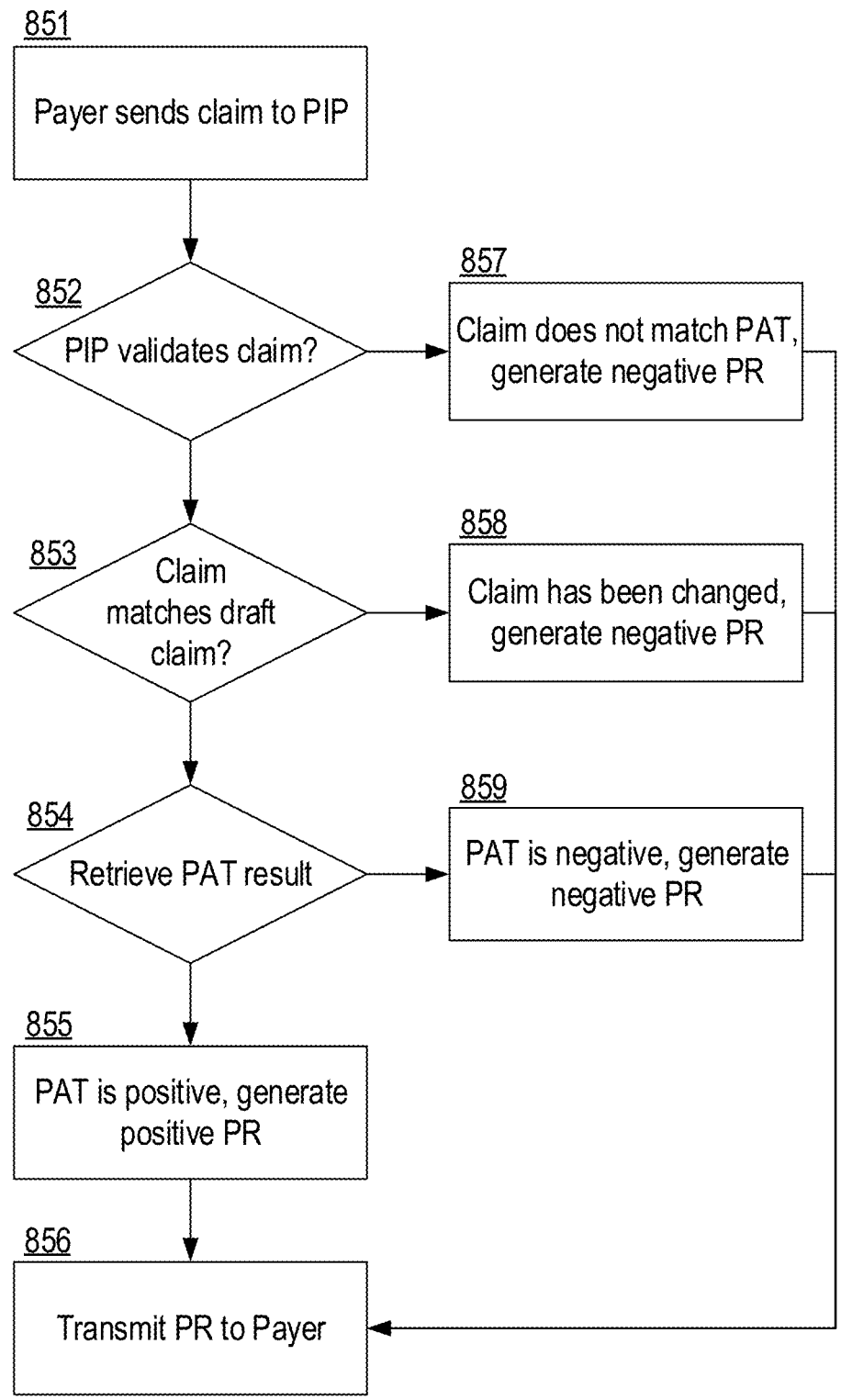
FIG. 8B is a flowchart for exemplary operations, steps, and processes in accordance with the embodiment of FIG. 8A.

However, if the PIP 410 is able to validate the PAT 12, 13 as having a valid encryption signature and as matching the claim 10, the PIP 410 may determine whether the claim 10 is unchanged relative to the corresponding draft claim 11 that led to the generation of the associated PAT 12, 13, as indicated at 818 of FIG. 8A and Block 853 of FIG. 8B. As discussed above, if the claim 10 is modified as compared with the related draft claim 11 submitted during the pre-approval process (e.g., the procedure code included with the claim has changed; a provider-generated differential has changed for a claim assessment; and/or the like), the PIP 410 may generate a negative payment recommendation 20 to be provided to the payer, as reflected at Block 858 of FIG. 8B. In certain embodiments, the PIP 410 may provide additional explanatory information/data indicating that the claim 10 does not match the draft claim 11 for which the PAT 12, 13 was originally generated. In other embodiments, the PIP 410 may proceed to analyze the claim 10 under a traditional claim submission approach if the claim 10 does not match the draft claim 11 for which the PAT 12, 13 was generated, as reflected in the discussion above associated with FIG. 4.

If the PIP 410 determines that the claim 10 matches the draft claim 11 for which the PAT 12, 13 was generated, the PIP 410 retrieves the PAT result (e.g., an indication of whether the PAT is a positive PAT 13 to be correlated to a positive payment recommendation 20 or a negative PAT 12 to be correlated to a negative payment recommendation 20) as indicated at Block 854 of FIG. 8B. The PIP 410 thereafter utilizes the PAT result to generate the payment recommendation 20, which is subsequently provided to the payer 400. Specifically, if the PAT is embodied as a negative PAT 12, the PIP 410 generates a negative payment recommendation, as indicated at Block 859 of FIG. 8B. If the PAT is embodied as a positive PAT 13, the PIP 410 generates a positive payment recommendation as indicated at Block 855 of FIG. 8B. Finally, as shown at Block 856 of FIG. 8B, the PIP 410 transmits the payment recommendation to the payer 400.

e. Data Aggregation

As indicated with respect to FIGS. 6A-6B, the payer 400 may send risk model information/data periodically to the PIP 410 for inclusion within the one or more risk models generated to provide payment recommendations (e.g., during a pre-approval process in which a draft claim 11 is analyzed to generate a PAT 12, 13) or during a formal claim submission process in which a claim 10 is analyzed to determine a formal payment recommendation for the payer 400. Thus, the PIP 410 (e.g., via an analytic computing entity 65) can aggregate relevant risk model information/data into a training dataset to train one or more neural networks (e.g., corresponding to one or more of the risk models). For example, risk model information/data provided by the payer 400 and indicative of a historical claim may be aggregated with existing claim information/data to be utilized for training a neural network relating to a claim model. The same claim information/data may be analyzed to identify a member and/or provider associated with the claim, and the claim information/data may be further provided to relevant member models and/or provider models in association with the identified members and/or providers for training neural networks relating to the member models and/or claim models.

f. Train Neural Network

As will be recognized, artificial neural networks are designed to recognize patterns using machine learning algorithms. Typically, the patterns they recognize are numerical, contained in vectors, into which real-world information/data is translated. With regard to embodiments of the present invention, the real world information/data may comprise historical claim information/data, historical member information/data, historical provider information/data, and/or the like. The desired features of the relevant risk model information/data are extracted and formatted into multidimensional vectors to be input into one or more neural networks. The neural networks comprise one or more layers that receive, amplify or dampen the input, and provide an output. For multiple layers, each layer's output is simultaneously the subsequent layer's input. With regard to generating a risk score for a given claim 10 (or draft claim 11), the neural network may determine vector distances between numerical representations of attributes of the claim 10 and relevant attributes as reflected within the neural network model, generated based at least in part on the historical information/data reflected within the risk model information/data.

As will be recognized, training and/or retraining a neural network involves providing a training dataset to the neural network. The training dataset contains the target output or variable (e.g., the risk score) that the machine-learning model is to eventually predict along with the related features. The neural network detects patterns in the training dataset that map the input information/data attributes from the feature sets to the target output or variable and captures these patterns. The resulting neural network is then able to generate risk scores even for scenarios in which the exact combination of claim attributes has not been analyzed previously. The scores can be determined in real-time or near real-time—such as when a new claim 10 or draft claim 11 is received for generation of a payment recommendation 20 and/or PAT 12, 13.

As a result of the training or retraining, one or more neural networks are generated to subsequently generate risk scores of previously unconsidered claims. For instance, using the neural network, the PIP 410 (e.g., via an analytic computing entity 65) generates one or more risk scores for the claim, which may then be correlated into a payment recommendation 20 and/or PAT 12, 13.

In one embodiment, the PIP 410 (e.g., via an analytic computing entity 65) can retrain the neural network on a regular or continuous basis or in response to certain triggers. This may be necessary as additional/new risk score information/data is introduced from the payer 400 over time. In one embodiment, the PIP 410 (e.g., via an analytic computing entity 65) may retrain a neural network when actions occur for a claim (e.g., being denied, paid, accessed, appealed, and/or the like) on a regular basis.

As will be appreciated, the hidden and/or weak correlations found as a result of the neural network are simply not practical for human-implementation. In addition to outputting risk scores of previously unconsidered claims, the neural networks can be retrained on a continuous, regular, or triggered basis.

VI. Conclusion

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for generating a pre-approval token (PAT) reflecting the content of a draft medical claim and utilizing the PAT together with a formal medical claim for resolving the formal medical claim, the method comprising:
receiving, by one or more processors, a draft claim comprising draft claim data transmitted from a first analytic computing entity of a plurality of analytic computing entities, wherein the draft claim data identifies one or more medical services or medications provided to a patient;
determining, by the one or more processors, an approval status of the draft claim, wherein determining an approval status of the draft claim comprises:
validating contents of the draft claim to ensure the contents of the draft claim match content requirements;
determining a risk score for the draft claim by:
executing a first artificial-intelligence risk model trained based on first training data comprising historical claim data and corresponding data indicating whether historical claims reflected within the historical claim data were paid, wherein executing the first artificial-intelligence model for the draft claim comprises comparing portions of the draft claim data with historical claims and outputting a first score for the draft claim;
executing a second artificial-intelligence risk model trained based on second training data comprising patient-specific data identifying attributes of each of a plurality of patients and corresponding data indicating whether flags are associated with the identified attributes of each of the plurality of patients, wherein executing the second artificial-intelligence model for the draft claim comprises comparing portions of the draft claim data with the patient-specific data and outputting a second score for the draft claim; and
executing a third artificial-intelligence risk model trained based on third training data comprising provider-specific data identifying attributes of each of a plurality of providers and corresponding data indicating whether any flags are associated with the identified attributes of each of the plurality of providers, wherein executing the third artificial-intelligence model for the draft claim comprises comparing portions of the draft claim data with the provider-specific data and outputting a third score for the draft claim;
combining output of each of the first artificial-intelligence risk model, the second artificial-intelligence risk model, and the third artificial-intelligence risk model to generate the risk score; and
determining whether the risk score for the draft claim satisfies an approval status criteria;
generating, by the one or more processors and based at least in part on the draft claim, a pre-approval token (PAT) comprising an alphanumeric string comprising a representation of at least a portion of the draft claim data and the approval status of the draft claim;
transmitting, by the one or more processors, the PAT to the first analytic computing entity;
receiving, by the one or more processors, a formal claim paired with the PAT transmitted from a second analytic computing entity of the plurality of analytic computing entities;
validating, by the one or more processors, the formal claim against the PAT at least in part by determining whether a representation of at least a portion of the formal claim matches the draft claim represented within the alphanumeric string of the PAT; and
upon determining that the representation of at least a portion of the formal claim matches the draft claim represented within the alphanumeric string of the PAT, resolving the formal claim based on the approval status identified by the PAT by transmitting a message to the second analytic computing entity, wherein the message comprises a payment recommendation for the formal claim.

2. The computer-implemented method of claim 1, wherein generating a PAT comprises:
combining at least a portion of the draft claim data and the approval status of the draft claim to create PAT data; and
hashing the PAT data to generate the PAT.

3. The computer-implemented method of claim 2, wherein generating a PAT further comprises cryptographically signing the PAT.

4. The computer-implemented method of claim 1, wherein validating the formal claim against the PAT comprises determining whether the formal claim is a modified version of the draft claim.

5. The computer-implemented method of claim 1, wherein resolving the formal claim comprises:
upon determining that the approval status is a positive approval status, transmit a positive payment recommendation to the second analytic computing entity; and
upon determining that the approval status is a negative approval status, transmit a negative payment commendation to the second analytic computing entity.

6. A computing system comprising a non-transitory computer readable storage medium and one or more processors, the computing system configured to:
receive a draft claim comprising draft claim data transmitted from a first analytic computing entity of a plurality of analytic computing entities, wherein the draft claim data identifies one or more medical services or medications provided to a patient;
determine an approval status of the draft claim, wherein determining an approval status of the draft claim comprises:
validating contents of the draft claim to ensure the contents of the draft claim match content requirements;
determining a risk score for the draft claim by:
executing a first artificial-intelligence risk model trained based on first training data comprising historical claim data and corresponding data indicating whether historical claims reflected within the historical claim data were paid, wherein executing the first artificial-intelligence model for the draft claim comprises comparing portions of the draft claim data with historical claims and outputting a first score for the draft claim;
executing a second artificial-intelligence risk model trained based on second training data comprising patient-specific data identifying attributes of each of a plurality of patients and corresponding data indicating whether flags are associated with the identified attributes of each of the plurality of patients, wherein executing the second artificial-intelligence model for the draft claim comprises comparing portions of the draft claim data with the patient-specific data and outputting a second score for the draft claim; and executing a third artificial-intelligence risk model trained based on third training data comprising provider-specific data identifying attributes of each of a plurality of providers and corresponding data indicating whether any flags are associated with the identified attributes of each of the plurality of providers, wherein executing the third artificial-intelligence model for the draft claim comprises comparing portions of the draft claim data with the provider-specific data and outputting a third score for the draft claim;

combining output of each of the first artificial-intelligence risk model, the second artificial-intelligence risk model, and the third artificial-intelligence risk model to generate the risk score; and determining whether the risk score for the draft claim satisfies an approval status criteria;

generate, based at least in part on the draft claim, a pre-approval token (PAT) comprising an alphanumeric string comprising a representation of at least a portion of the draft claim data and the approval status of the draft claim;

transmit the PAT to the first analytic computing entity;

receive a formal claim paired with the PAT transmitted from a second analytic computing entity of the plurality of analytic computing entities;

validate the formal claim against the PAT at least in part by determining whether a representation of at least a portion of the formal claim matches the draft claim represented within the alphanumeric string of the PAT; and upon determining that the representation of at least a portion of the formal claim matches the draft claim represented within the alphanumeric string of the PAT, resolve the formal claim based on the approval status identified by the PAT by transmitting a message to the second analytic computing entity, wherein the message comprises a payment recommendation for the formal claim.

7. The computing system of claim 6, wherein generating a PAT comprises:
combining at least a portion of the draft claim data and the approval status of the draft claim to create PAT data; and
hashing the PAT data to generate the PAT.

8. The computing system of claim 7, wherein generating a PAT further comprises cryptographically signing the PAT.

9. The computing system of claim 6, wherein validating the formal claim against the PAT comprises determining whether the formal claim is a modified version of the draft claim.

10. The computing system of claim 6, wherein resolving the formal claim comprises:
upon determining that the approval status is a positive approval status, transmit a positive payment recommendation to the second analytic computing entity; and
upon determining that the approval status is a negative approval status, transmit a negative payment commendation to the second analytic computing entity.

11. A computer program product comprising a non-transitory computer readable medium having computer program instructions stored therein, the computer program instructions when executed by a processor, cause the processor to:

receive a draft claim comprising draft claim data transmitted from a first analytic computing entity of a plurality of analytic computing entities, wherein the draft claim data identifies one or more medical services or medications provided to a patient;

determine an approval status of the draft claim, wherein determining an approval status of the draft claim comprises:
validating contents of the draft claim to ensure the contents of the draft claim match content requirements;
determining a risk score for the draft claim by:
executing a first artificial-intelligence risk model trained based on first training data comprising historical claim data and corresponding data indicating whether historical claims reflected within the historical claim data were paid, wherein executing the first artificial-intelligence model for the draft claim comprises comparing portions of the draft claim data with historical claims and outputting a first score for the draft claim;
executing a second artificial-intelligence risk model trained based on second training data comprising patient-specific data identifying attributes of each of a plurality of patients and corresponding data indicating whether flags are associated with the identified attributes of each of the plurality of patients, wherein executing the second artificial-intelligence model for the draft claim comprises comparing portions of the draft claim data with the patient-specific data and outputting a second score for the draft claim; and
executing a third artificial-intelligence risk model trained based on third training data comprising provider-specific data identifying attributes of each of a plurality of providers and corresponding data indicating whether any flags are associated with the identified attributes of each of the plurality of providers, wherein executing the third artificial-intelligence model for the draft claim comprises comparing portions of the draft claim data with the provider-specific data and outputting a third score for the draft claim;
combining output of each of the first artificial-intelligence risk model, the second artificial-intelligence risk model, and the third artificial-intelligence risk model to generate the risk score; and
determining whether the risk score for the draft claim satisfies an approval status criteria;

generate, based at least in part on the draft claim, a pre-approval token (PAT) comprising an alphanumeric string comprising a representation of at least a portion of the draft claim data and the approval status of the draft claim;

transmit the PAT to the first analytic computing entity;

receive a formal claim paired with the PAT transmitted from a second analytic computing entity of the plurality of analytic computing entities;

validate the formal claim against the PAT at least in part by determining whether a representation of at least a portion of the formal claim matches the draft claim represented within the alphanumeric string of the PAT; and upon determining that the representation of at least a portion of the formal claim matches the draft claim represented within the alphanumeric string of the PAT, resolve the formal claim based on the approval status identified by the PAT by transmitting a message to the second analytic computing entity, wherein the message comprises a payment recommendation for the formal claim.

12. The computer-program product of claim 11, wherein generating a PAT comprises:
   combining at least a portion of the draft claim data and the approval status of the draft claim to create PAT data; and
   hashing the PAT data to generate the PAT.

13. The computer-program product of claim 12, wherein generating a PAT further comprises cryptographically signing the PAT.

14. The computer-program product of claim 11, wherein validating the formal claim against the PAT comprises determining whether the formal claim is a modified version of the draft claim.

15. The computer-program product of claim 11, wherein resolving the formal claim comprises:
   upon determining that the approval status is a positive approval status, transmit a positive payment recommendation to the second analytic computing entity; and
   upon determining that the approval status is a negative approval status, transmit a negative payment commendation to the second analytic computing entity.

* * * * *

UNITED STATES PATENT AND TRADEMARK OFFICE
CERTIFICATE OF CORRECTION

PATENT NO. : 11,574,365 B2
APPLICATION NO. : 16/442698
DATED : February 7, 2023
INVENTOR(S) : Kurt Indermaur It is certified that error appears in the above-identified patent and that said Letters Patent is hereby corrected as shown below:

In the Drawings

In sheet 5 of 14, FIG. 4A, reference numeral 414, Line 2, delete "AdditionalInfo" and insert -- Additional Info --, therefor.

In the Claims

In Column 31, Claim 12, Line 7, delete "computer-program product" and insert -- computer program product --, therefor.

In Column 31, Claim 13, Line 13, delete "computer-program product" and insert -- computer program product --, therefor.

In Column 31, Claim 14, Line 16, delete "computer-program product" and insert -- computer program product --, therefor.

In Column 31, Claim 15, Line 20, delete "computer-program product" and insert -- computer program product --, therefor.

Signed and Sealed this
Second Day of May, 2023

Katherine Kelly Vidal
*Director of the United States Patent and Trademark Office*